(12) United States Patent
Hahn

(10) Patent No.: US 11,840,315 B2
(45) Date of Patent: Dec. 12, 2023

(54) GEAR CHANGER ADJUSTMENT AND DEVICE

(71) Applicant: SRAM, LLC, Chicago, IL (US)

(72) Inventor: Sage Hahn, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 352 days.

(21) Appl. No.: 16/863,409

(22) Filed: Apr. 30, 2020

(65) Prior Publication Data

US 2020/0346714 A1 Nov. 5, 2020

Related U.S. Application Data

(60) Provisional application No. 62/841,924, filed on May 2, 2019.

(51) Int. Cl.
*B62M 9/122* (2010.01)
*B62M 9/1244* (2010.01)
*B62M 9/126* (2010.01)

(52) U.S. Cl.
CPC ............ *B62M 9/122* (2013.01); *B62M 9/126* (2013.01); *B62M 9/1244* (2013.01)

(58) Field of Classification Search
CPC ..... B62M 9/122; B62M 9/1244; B62M 9/126
USPC ........................................................ 474/70
See application file for complete search history.

(56) References Cited

U.S. PATENT DOCUMENTS

| | | | |
|---|---|---|---|
| 7,285,064 B2 | 10/2007 | Ichida et al. | |
| 2009/0164076 A1* | 6/2009 | Vasiliotis | B62M 6/40 |
| | | | 701/55 |
| 2012/0130603 A1* | 5/2012 | Simpson | B62M 25/08 |
| | | | 701/51 |
| 2013/0090196 A1 | 4/2013 | Yamaguchi et al. | |
| 2015/0210354 A1 | 7/2015 | Kuroda et al. | |
| 2016/0288877 A1* | 10/2016 | Goates | B62M 9/122 |
| 2017/0051828 A1* | 2/2017 | Zhang | B62M 9/122 |
| 2017/0327184 A1* | 11/2017 | Contello | B62M 9/06 |
| 2018/0208269 A1* | 7/2018 | Nose | B62M 25/08 |
| 2019/0351971 A1* | 11/2019 | Dueweling | B62M 9/123 |

FOREIGN PATENT DOCUMENTS

| | | |
|---|---|---|
| CN | 101513920 A | 8/2009 |
| CN | 103569308 A | 2/2014 |
| CN | 108569366 A | 9/2018 |
| CN | 108725686 A | 11/2018 |
| CN | 109477572 A | 3/2019 |
| EP | 3578451 | 12/2019 |
| TW | 201806815 | 3/2018 |

\* cited by examiner

*Primary Examiner* — Gene O Crawford
*Assistant Examiner* — Emily R Kincaid

(57) ABSTRACT

In an adjustment mode for a derailleur of a bicycle, acceleration values from an accelerometer of the derailleur are sampled as the derailleur moves through sprockets of a rear sprocket assembly. Acceleration signal powers are identified based on the sampled acceleration values, and potential rasping positions are identified based on thresholding of the acceleration signal powers. The identified potential rasping positions are compared to expected rasping positions, and adjustment for the derailleur is set based on a minimum error between the identified potential rasping positions and the expected rasping positions.

21 Claims, 17 Drawing Sheets

GEAR CHANGER ADJUSTMENT AND DEVICE

FIELD OF THE DISCLOSURE

The present disclosure is generally directed to a bicycle derailleur, and more particularly, to adjustment of an electromechanical rear derailleur for a bicycle.

INTRODUCTION

Bicycle rear derailleurs are well known in the art as a part of a drivetrain of a bicycle. The typical drivetrain also includes a crank assembly that is coupled to one or more sprockets. The crank assembly is operable to drive a chain that is routed or wrapped around one of the sprockets. The chain is also routed to the rear wheel of the bicycle.

Rear derailleurs are provided as a part of the drivetrain to perform two basic functions. The primary function of the rear derailleur is to selectively shift a bicycle chain of the drivetrain among a series of different diameter cogs that are attached to the rear wheel. Shifting of the bicycle chain from one cog to another at the rear wheel is done in order to change the gear ratio of the drivetrain. The secondary function of the rear derailleur is to apply a tension to the chain to take-up slack, as well as to maintain the desired tension, in the chain on the non-drive-side of the drivetrain.

The rear derailleur may be a wireless, electrically actuated rear derailleur. A motor module and a battery electrically connected to the motor module may be carried on the electric rear derailleur. The battery supplies power to the motor module to switch a chain among rear sprockets of the bicycle.

The rear derailleur is aligned with sprockets of a rear sprocket assembly after assembly of the bicycle and prior to a first ride. Without proper alignment of the rear derailleur, the bicycle chain may skip sprockets or may not shift at all. Due to the complexity of the process, alignment of the rear derailleur may be performed by a mechanic at a bicycle shop, not the rider.

SUMMARY

In one example, an electromechanical derailleur for a bicycle includes a base member mountable to a frame of the bicycle, a movable member movably coupled to the base member, and a chain guide assembly rotatably connected to the movable member. The electromechanical derailleur also includes a processor configured to identify potential chain rasping positions based on sensor data and identify a plurality of datasets. Each dataset of the plurality of datasets represents expected chain rasping positions for each gear of a plurality of gears. The processor is configured to identify an adjustment for the electromechanical derailleur based on the identified potential chain rasping positions and the plurality of datasets, and operate the electromechanical derailleur based on the identified adjustment.

In one example, the processor is further configured to identify a plurality of first datasets. Each first dataset of the plurality of first datasets includes data represents an acceleration of a portion of the electromechanical derailleur at a respective position of the chain guide assembly relative to the base member. The plurality of datasets are a plurality of second datasets.

In one example, the identification of the adjustment for the electromechanical derailleur includes comparison of the potential chain rasping positions with the plurality of second datasets, and identification of a second dataset of the plurality of second datasets based on the comparison. Operation of the electromechanical derailleur based on the identified adjustment includes operation of the electromechanical derailleur based on the identification of the second dataset.

In one example, the electromechanical derailleur further includes a memory configured to store the plurality of first datasets, the identified potential chain rasping positions, the plurality of second datasets, or any combination thereof.

In one example, the memory is configured to store the plurality of first datasets in a sequential order. The identification of potential chain rasping positions includes, in the sequential order, for each first dataset of at least some first datasets of the plurality of first datasets, determination of whether the respective acceleration is greater than a predetermined threshold acceleration and determination of whether the respective acceleration is greater than each of a predetermined number of sequentially previous accelerations of the plurality of first datasets. The identification of potential chain rasping positions further includes identification, based on the determinations, of the respective position as one of the potential chain rasping positions when the respective acceleration is greater than the predetermined threshold acceleration and the respective acceleration is greater than each of the predetermined number of sequentially previous accelerations.

In one example, the identification of the plurality of second datasets includes identification of a table. Each second dataset of the plurality of second datasets forms a column or a row of the table and is associated with a respective adjustment index. Operation of the electromechanical derailleur based on the identification of the second dataset includes operation of the electromechanical derailleur based on the adjustment index associated with the identified second dataset.

In one example, the processor is further configured to identify one or more third datasets. Each third dataset of the one or more third datasets represents a position target for each gear of the plurality of gears and is associated with a respective adjustment index. Operation of the electromechanical derailleur based on the adjustment index associated with the identified second dataset includes identification of a third dataset of the plurality of third datasets based on the adjustment index associated with the identified second dataset, and operation of the electromechanical derailleur based on the identified third dataset.

In one example, the electromechanical derailleur further includes at least one accelerometer disposed within the movable member, the chain guide assembly, or the movable member and the chain guide assembly. The at least one accelerometer is configured to generate the data representing the acceleration. The portion of the electromechanical derailleur includes the movable member.

In one example, the electromechanical derailleur further includes a motor configured to move the movable member relative to the base member. The identification of the plurality of first datasets includes movement, with the motor, of the movable member relative to the base member, such that the chain guide assembly is positioned in a first of the positions of the chain guide assembly relative to the base member. The identification of the plurality of first datasets further includes identification, with one or more sensors, of one or more acceleration values for the portion of the electromechanical derailleur when the chain guide assembly is in the first position. The identification of the plurality of first datasets further includes, for each of the positions, movement, with the motor, of the movable member relative to the base member, such that the chain guide assembly is positioned in a respective one of the positions relative to the base member, and identification, with the one or more sensors, of one or more acceleration values for the portion of the electromechanical derailleur when the chain guide assembly is in the respective one position. The identification of the plurality of first datasets further includes generation of the plurality of first datasets based on the acceleration values identified for the positions of the chain guide assembly relative to the base member, respectively.

In one example, the positions of the chain guide assembly relative to the base member define a range of motion between a smallest gear of the plurality of gears and a largest gear of the plurality of gears. The chain guide assembly is aligned with the smallest gear when the chain guide assembly is in the first position.

In one example, the one or more sensors include one or more accelerometers integral with the electromechanical derailleur.

In one example, the processor is further configured to initiate an automatic adjustment mode. The automatic adjustment mode includes the identification of the plurality of first datasets, the identification of potential chain rasping positions, the identification of the plurality of second datasets, and the identification of the adjustment for the electromechanical derailleur. The processor is further configured to, after the initiation of the automatic adjustment mode and before the identification of the plurality of first datasets, determine whether a pedaling condition is met, and abort the automatic adjustment mode when the processor determines the pedaling condition is not met.

In one example, the processor is further configured to receive user input data. The initiation of the automatic adjustment mode includes initiation of the automatic adjustment mode in response to the received user input data.

In one example, the electromechanical derailleur further includes an output device. The processor is further configured to generate, with the output device, an audio output, a visual output, or an audio and visual output when the automatic adjustment mode is aborted.

In one example, the output device includes a noise generator, a light emitting diode (LED), or the noise generator and the LED.

In one example, a method for automatically adjusting an electromechanical derailleur for a bicycle includes identifying, by a processor, a plurality of first datasets. Each first dataset of the plurality of first datasets includes data representing an acceleration of a portion of the bicycle and data representing a corresponding position of a chain guide assembly relative to the base member. The method also includes identifying, by the processor, potential chain rasping positions based on the plurality of first datasets, and identifying, by the processor, a plurality of second datasets. Each second dataset of the plurality of second datasets represents expected chain rasping positions for each gear of a plurality of gears. The method includes identifying, by the processor, an adjustment for the electromechanical derailleur based on the identified potential chain rasping positions and the plurality of second datasets, and operating, by the processor, the electromechanical derailleur based on the identified adjustment.

In one example, the method further includes storing, by a memory, the plurality of first datasets. Identifying the plurality of first datasets includes identifying the plurality of first datasets from the memory.

In one example, identifying the adjustment for the electromechanical derailleur includes comparing the potential chain rasping positions with the plurality of second datasets, and identifying a second dataset of the plurality of second datasets based on the comparing. Operating the electromechanical derailleur based on the identified adjustment includes instructing, by the processor, a motor of the electromechanical derailleur to move the chain guide assembly based on the identification of the second dataset.

In one example, operating the electromechanical derailleur further includes receiving, by the processor, a request to shift gears generated in response to a user input, and instructing, by the processor, the motor to move based on the received request and an index associated with the identified second dataset.

In one example, a rear derailleur for a bicycle includes a base member mountable to a frame of the bicycle, a movable member movably coupled to the base member, and a chain guide assembly rotatably connected to the movable member. The rear derailleur further includes a processor configured to initiate an automatic adjustment mode. The automatic adjustment mode includes generation of a plurality of first datasets. Each first dataset of the plurality of first datasets includes data representing an acceleration of a portion of the rear derailleur and data representing a corresponding position of the chain guide assembly relative to the base member. The automatic adjustment mode further includes identification of potential chain rasping positions based on the plurality of first datasets, identification of a plurality of second datasets, and comparison of the identified potential chain rasping positions with the plurality of second datasets. The automatic adjustment mode further includes selection of a second dataset of the plurality of second datasets based on the comparison, and identification of target positions for shifting based on the selected second dataset. Each second dataset of the plurality of second datasets represents expected chain rasping positions for each gear of a plurality of gears. The processor is further configured to operate the rear derailleur based on the identified target positions.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The present disclosure provides examples of electrically actuated bicycle rear derailleurs and methods of adjusting electrically actuated bicycle rear derailleurs that solve or improve upon one or more of the disadvantages described above with prior known bicycle rear derailleurs and methods of adjusting bicycle rear derailleurs. The disclosed rear derailleurs and methods of adjusting rear derailleurs allow a user to initiate an automatic adjustment mode for alignment of a rear derailleur. Once the automatic adjustment mode is initiated and entered, the user pedals the bicycle by hand, and a processor of the bicycle (e.g., a processor of the rear derailleur) automatically identifies a global adjustment for the rear sprocket assembly, for proper alignment of the rear derailleur. The processor identifies the adjustment (e.g., an adjustment index) based on data from one or more sensors (e.g., accelerometers and a position feedback sensor) and predetermined data (e.g., a table of gear position targets and expected rasping positions). The user can easily adjust the rear derailleur before riding the bicycle for the first time, after installation of a new drive train component (e.g., a rear sprocket assembly and/or the electrically actuated rear derailleur), and/or if the rear derailleur becomes misaligned.

Figure 1:
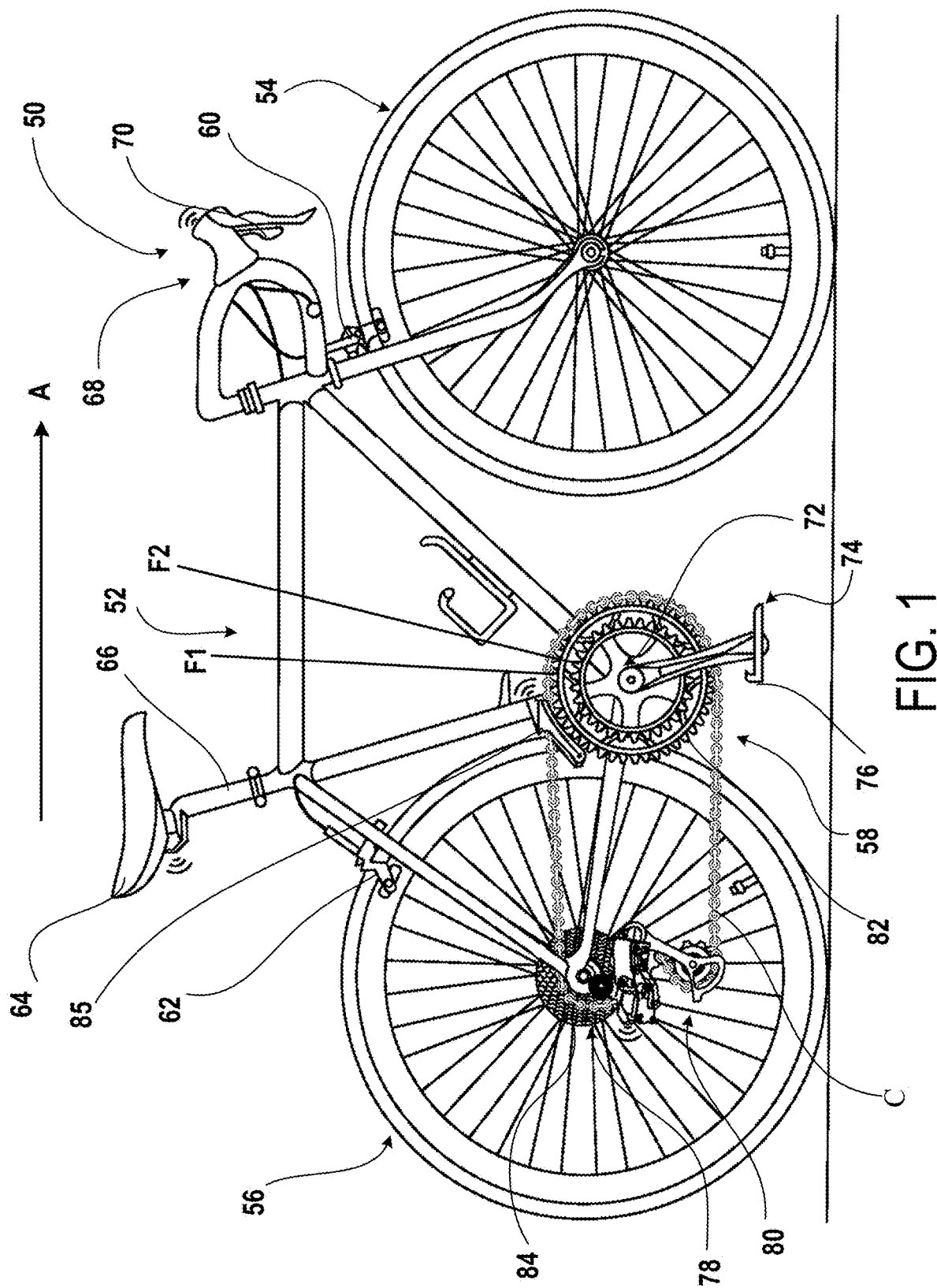
FIG. 1 is a side view schematic of one example of a bicycle that may be constructed to utilize a damper on the rear derailleur.

Turning now to the drawings, FIG. 1 generally illustrates a bicycle 50 that employs a rear derailleur constructed in accordance with the teachings of the present disclosure. The bicycle 50 includes a frame 52, a front wheel 54 and a rear wheel 56 each rotatably attached to the frame 52, and a drivetrain 58. A front brake 60 is provided for braking the front wheel 54, and a rear brake 62 is provided for braking the rear wheel 56. The bicycle 50 also generally has a seat 64 near a rear end of the frame 52 and carried on an end of a seat tube 66 connected to the frame 52. The bicycle 50 also has handlebars 68 near a forward end of the frame 52. A brake lever 70 is carried on the handlebars 68 for actuating the front brake 60, the rear brake 62, or both. If the brake lever 70 actuates only one of the front brake 60 and the rear brake 62, a second brake lever (not shown) may also be provided to actuate the other brake. A front and/or forward riding direction or orientation of the bicycle 50 is indicated by the direction of the arrow A in FIG. 1. As such, a forward direction for the bicycle 50 is indicated by the direction of arrow A.

While the illustrated bicycle 50 depicted in FIG. 1 is a road bike having drop-style handlebars 68, the present disclosure may be applicable to bicycles of any type, including mountain bikes with full or partial suspensions.

The drivetrain 58 has a chain C and a front sprocket assembly 72, which is coaxially mounted with a crank assembly 74 having pedals 76. The drivetrain 58 also includes a rear sprocket assembly 78 coaxially mounted with the rear wheel 56 and a rear gear change mechanism, such as a rear derailleur 80.

Figure 2:
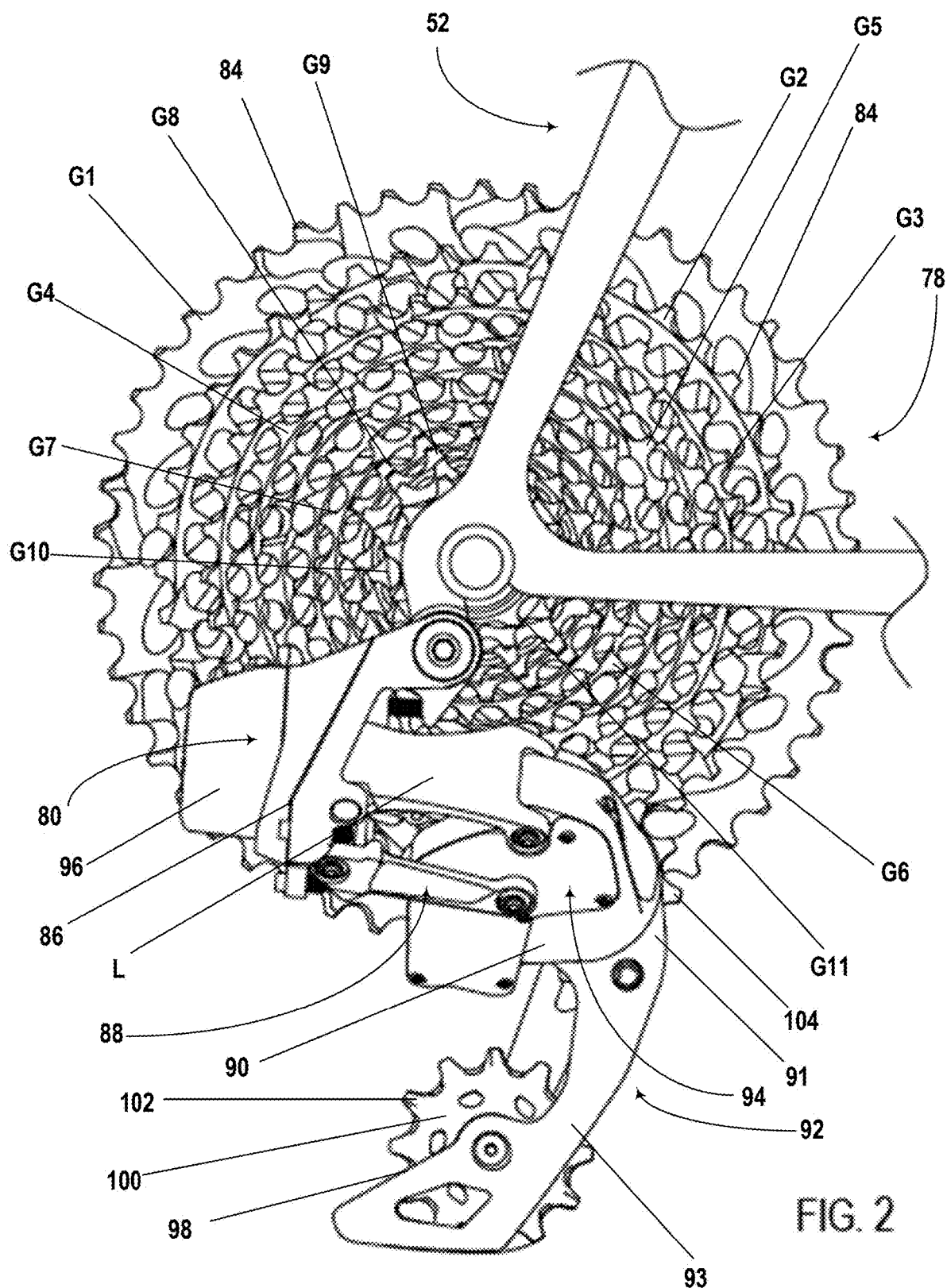
FIG. 2 is a close-up side view of one example of an electronic rear derailleur mounted to a bicycle.

As is illustrated in FIG. 1, the front sprocket assembly 72 may include one or more coaxially mounted chain rings, gears, or sprockets. In this example, the front sprocket assembly 72 has two such sprockets, F1 and F2, each having teeth 82 around a respective circumference. As shown in FIGS. 1 and 2, the rear sprocket assembly 78 may include a plurality (e.g., eleven) of coaxially mounted gears, cogs, or sprockets G1-G11. Each sprocket G1-G11 also has teeth 84 arranged around a respective circumference. The number of teeth 82 on the smaller diameter front sprocket F2 may be less than the number of teeth on the larger diameter sprocket F1. The number of teeth 84 on the rear sprockets G1-G11 may gradually decrease from the largest diameter rear sprocket G1 to the smallest diameter sprocket G11. Though not described in any detail herein, a front gear changer 85 may be operated to move from a first operating position to a second operating position to move the chain C between the front sprockets F1 and F2. Likewise, the rear derailleur 80 may be operable to move between eleven different operating positions to switch the chain C to a selected one of the rear sprockets G1-G11. In an embodiment, the rear sprocket assembly 72 may have more or fewer sprockets. For example, in an embodiment, a rear sprocket assembly may have twelve or thirteen sprockets. Dimensions and configuration of the rear derailleur 80 may be modified to accommodate a specific implemented plurality of sprockets. For example, an angle and length of the linkage and/or the configuration of the cage of the derailleur may be modified to accommodate specific sprocket combinations.

Figure 3:
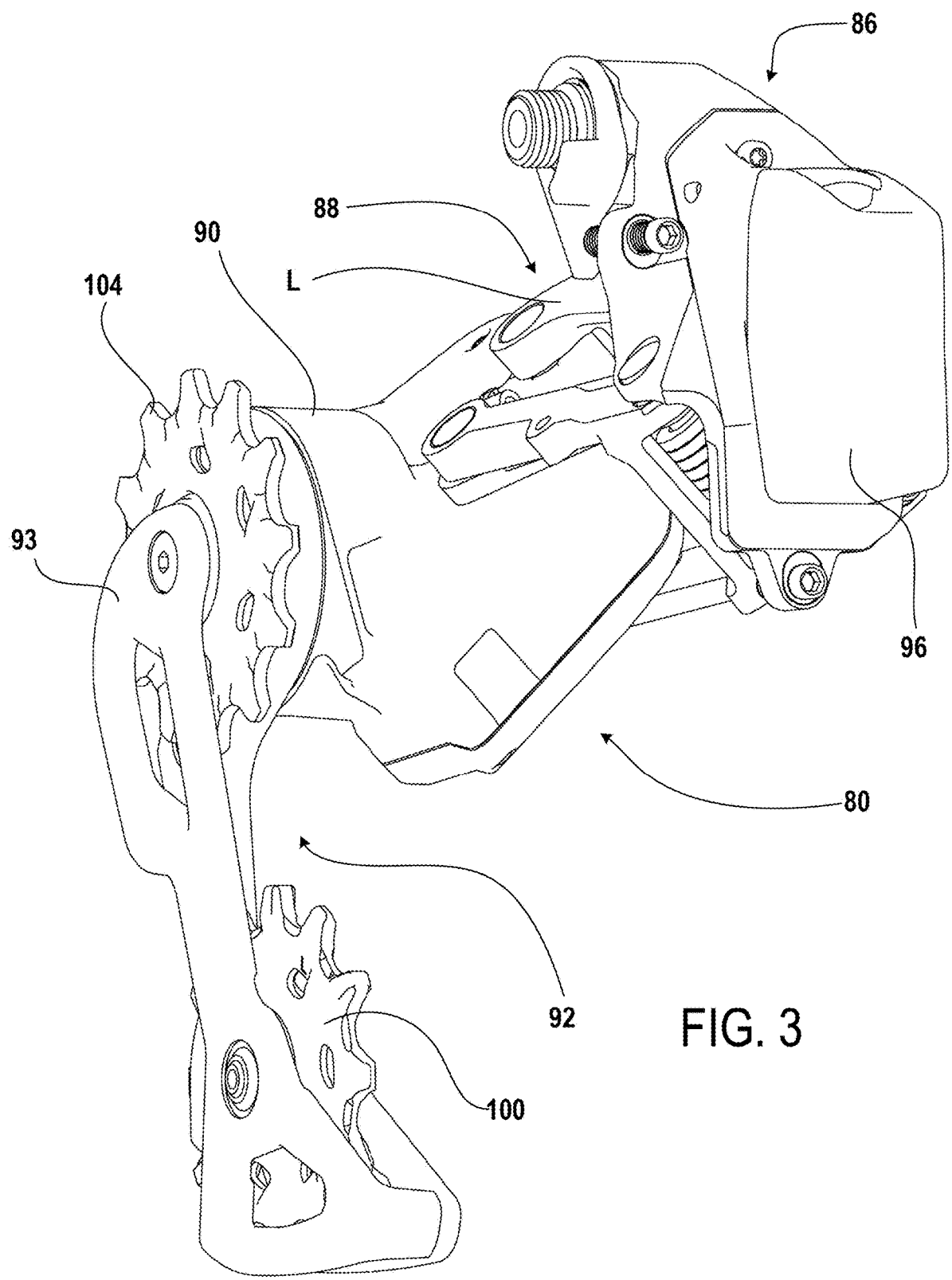
FIG. 3 is a first perspective view of one example of an electronic rear derailleur with a power supply installed.

Referring to FIGS. 2 and 3, the rear derailleur 80 is depicted in these examples as a wireless, electrically actuated rear derailleur mounted or mountable to the frame 52, or frame attachment, of the bicycle 50. The electric rear derailleur 80 has a base member 86 (e.g., a b-knuckle) that is mounted to the bicycle frame 52. A linkage 88 has two links L that are pivotally connected to the base member 86 at a base member linkage connection portion. A movable member 90 (e.g., a p-knuckle) is connected to the linkage 88 at a moveable member linkage connection portion. A chain guide assembly 92 (e.g., a cage) is configured to engage and maintain tension in the chain and has one or more cage plates 93 with a proximal end 91 that is pivotally connected to a part of the movable member 90. The cage plate 93 may rotate or pivot about a cage rotation axis in a damping direction and a chain tensioning direction opposite the damping direction.

A motor module 94 is carried on the electric rear derailleur 80 and has a battery 96. The battery 96 supplies power to the motor module 94. In one example, as illustrated in FIG. 2, the motor module 94 is located in the movable member 90. However, the motor module 94 may instead be located elsewhere, such as in one of the links L of the linkage 88 or in the base member 86. The motor module 94 may include a gear mechanism or transmission. As is known in the art, the motor module 94 and gear mechanism may be coupled with the linkage 88 to laterally move the cage plate 93 and thus switch the chain C among the rear sprockets (e.g., G1-G11) on the rear sprocket assembly 78.

The cage plate 93 also has a distal end 98 that carries a tensioner cog or wheel 100. The wheel 100 also has teeth 102 around a circumference. The cage plate 93 is biased in the chain tensioning direction to maintain tension in the chain C. The chain guide assembly 92 may also include a second cog or wheel, such as a guide wheel 104 disposed nearer the proximal end 91 of the cage plate 93 and the movable member 90. In operation, the chain C is routed around one of the rear sprockets (e.g., G1-G11). An upper segment of the chain C extends forward to the front sprocket assembly 72 and is routed around one of the front sprockets F1 or F2. A lower segment of the chain C returns from the front sprocket assembly 72 to the tensioner wheel 100 and is then routed forward to the guide wheel 104. The guide wheel 104 directs the chain C to the rear sprockets (e.g. G1-G11). Lateral movement of the cage plate 93, tensioner wheel 100, and guide wheel 104 may determine the lateral position of the chain C for alignment with a selected one of the rear sprockets (e.g. G1-G11).

Though not shown herein, a control unit may be mounted to the handlebars 68 for actuating the motor module 94 and operating the rear derailleur 80 for executing gear changes and gear selection. The control unit, however, may be located anywhere on the bicycle 50 or, alternatively, may be distributed among various components of the bicycle 50, with routing of a communication link to accommodate necessary signal and power paths. The control unit may also be located other than on the bicycle 50, such as, for example, on a rider's wrist or in a jersey pocket. The communication link may include wires, may be wireless, or may be a combination thereof. In one example, the control unit may be integrated with the rear derailleur 80 to communicate control commands between components. The control unit may include a processor, communication device (e.g. a wireless communication device), a memory, and one or more communication interfaces.

The battery 96 may instead be an alternate power supply or power source and may operate other electric components of the bicycle 50 within a linked system. Further, multiple power supplies may be provided, which may collectively or individually power the electric components of the system, including the rear derailleur 80, such as a drive motor for an embodiment involving an electrically powered bicycle. Additional batteries or other power supplies may be attached to the derailleur or located at other positions, such as the frame 52. In this example, however, the battery 96 is configured to be attached directly to the rear derailleur 80, and to provide power to the components of the rear derailleur 80. In an embodiment, the rear derailleur 80 is configured such that the battery 96 provides power to only the components of the rear derailleur 80.

The rear derailleur 80 may be any number of other types of derailleurs, for which gear calibration is to be provided. For example, the rear derailleur 80 may be a linear acting derailleur or a gear change device acting on an internal gear hub or a frame mounted multi gear gearbox. Additional types of derailleurs may be used.

Figure 4:
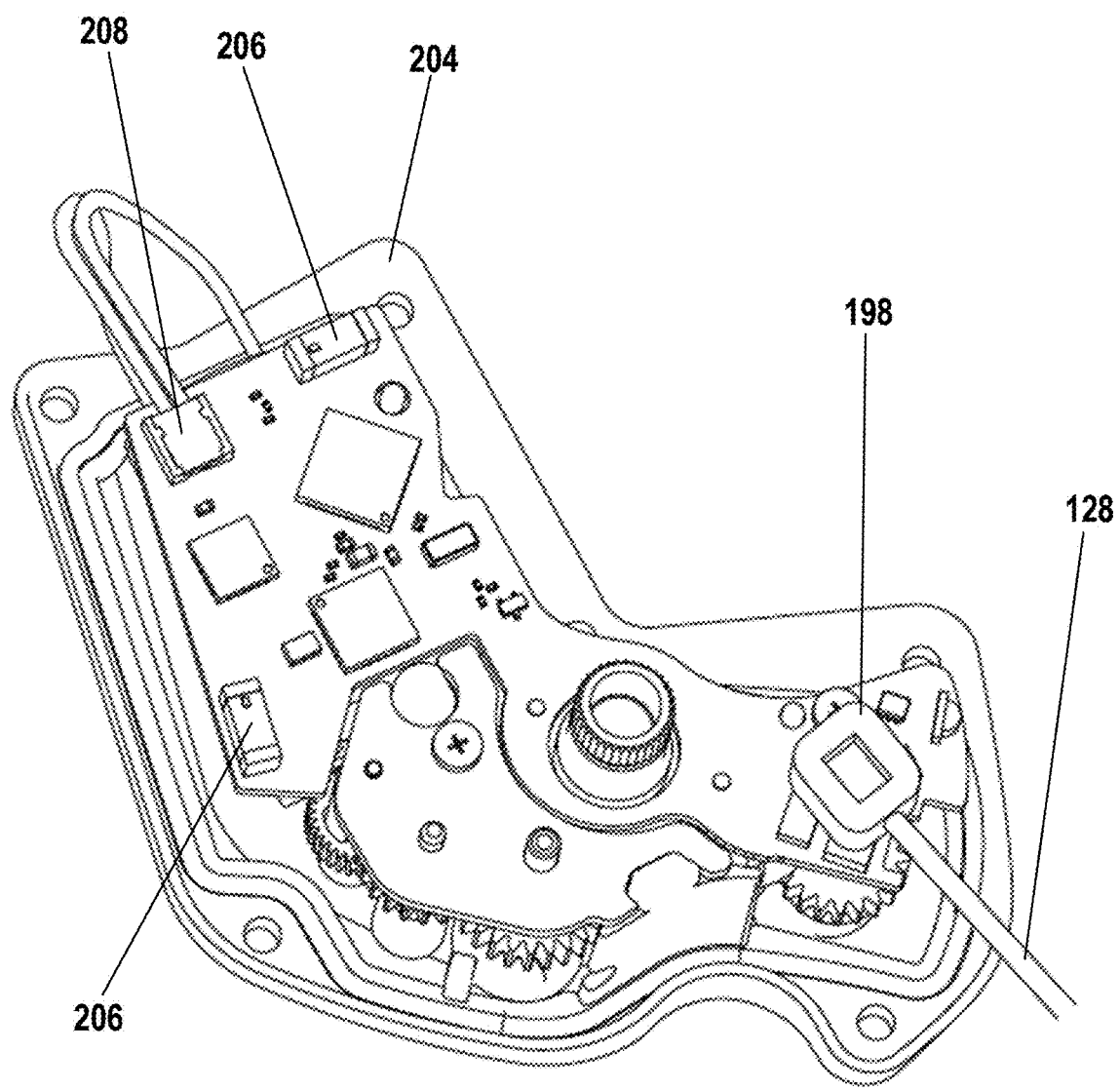
FIG. 4 is a perspective view of one example of a printed circuit board (PCB) that is supportable within a movable member, with a cable connected to the PCB.
Figure 5:
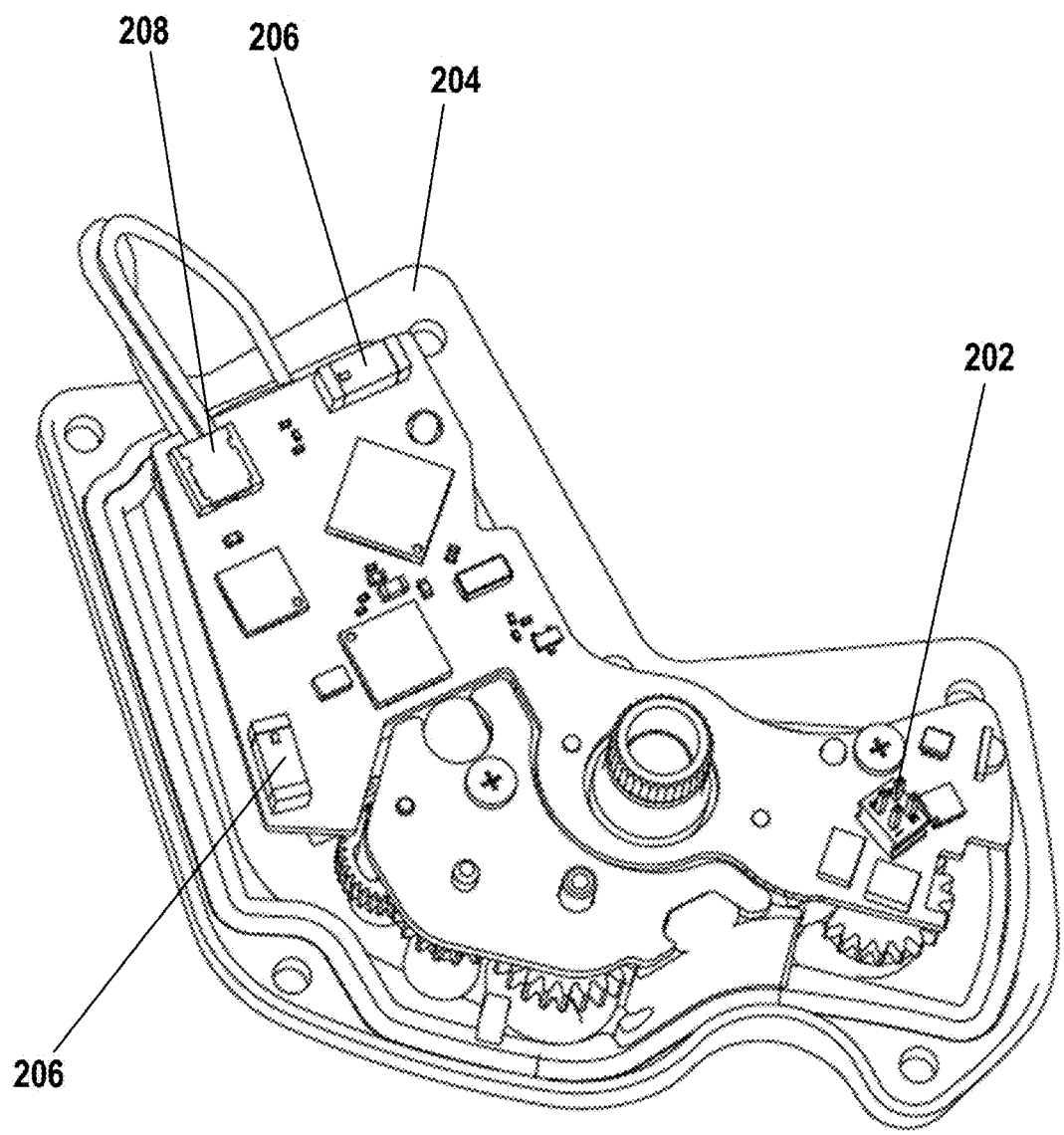
FIG. 5 is a perspective view of one example a PCB that is supportable within a movable member, without a cable connected to the PCB.

With reference to FIGS. 4 and 5, a printed circuit board (PCB) 204 is housed within the movable member 90. In other embodiments, the bicycle 50 includes additional PCBs in or on the rear derailleur 80 and/or other components of the bicycle 50. The battery 96, for example, powers components electrically connected to the PCB 204 via pins 180, a cable 128, connector 198, and/or connector 202 when the battery 96 is installed. The PCB 204 supports and/or the battery 96 powers any number of components within, for example, the rear derailleur 80 (e.g., within the movable member 90). For example, as shown in the examples of FIGS. 4 and 5, the PCB 204 supports one or more antennas 206 (e.g., two antennas), and via a motor connection 208 electrically connecting two different sides of the PCB 204, the battery 96 powers a motor. The PCB 204 may support and/or the battery 96 may power additional, fewer, and/or different components.

For example, the PCB 204 may support one or more processors (e.g., a processor) and one or more memories (e.g., a memory) in communication with the one or more processors. The memory may store predetermined data such as, for example, data representing gear position targets (e.g., a two-dimensional table of gear position targets, where one dimension is a target gear index, and the other dimension is an adjustment index), data representing expected rasping positions (e.g., a two-dimensional table of expected rasping position for each target gear index for each adjustment index), data representing approximate offsets (e.g., a one-dimensional table of approximate offset for each gear form any adjustment index), and/or additional data.

The processor (e.g., a microprocessor) may be any number of different types of processors including, for example, a general processor, a digital signal processor, an application specific integrated circuit (ASIC), a field programmable gate array (FPGA), an analog circuit, a digital circuit, combinations thereof, or other now known or later developed processors. The processor may be a single device or combinations of devices, such as through shared or parallel processing.

The memory may be a volatile memory or a non-volatile memory. The memory may include one or more of a read only memory (ROM), a random access memory (RAM), a flash memory, an electronic erasable program read only memory (EEPROM), and/or other types of memory. The memory may be removable from the PCB 204, such as a secure digital (SD) memory card. In a particular non-limiting, exemplary embodiment, a computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device. Accordingly, the disclosure is considered to include any one or more of a computer-readable medium and other equivalents and successor media, in which data or instructions may be stored. The memory is used to store instructions for the processor.

The memory may be a non-transitory computer-readable medium and may be described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

Dedicated hardware implementations, such as ASICS, programmable logic arrays, and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an ASIC. Accordingly, the present system encompasses software, firmware, and hardware implementations.

The PCB 204 may also support one or more sensors. For example, the PCB 204 may support and may power one or more accelerometers and a position feedback sensor. The one or more accelerometers and the position feedback sensor may be in communication with the processor and the memory. The one or more accelerometers and the position feedback sensor may be supported elsewhere on and/or within the rear derailleur 80 or the bicycle 50.

Figure 6:
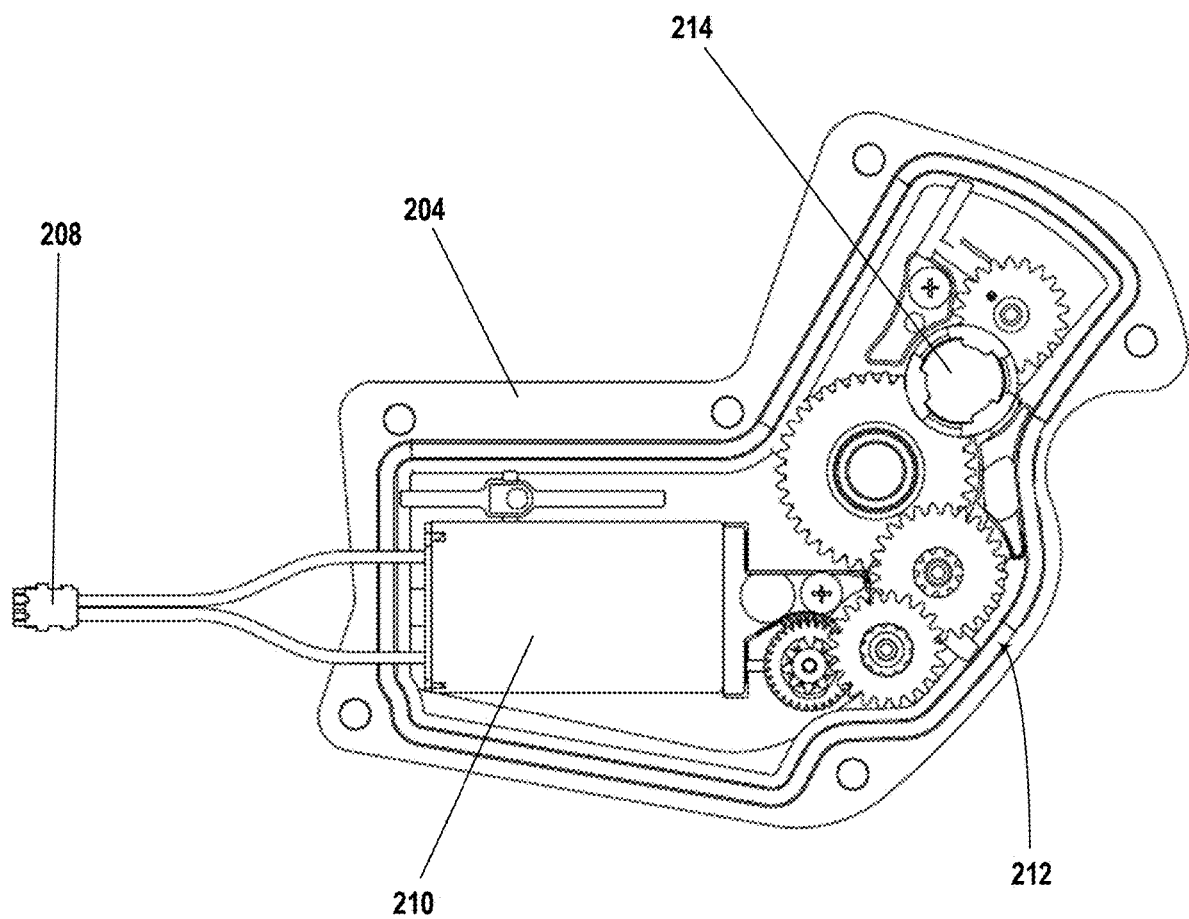
FIG. 6 is a side view of one example of a PCB that is supportable within a movable member.
Figure 7:
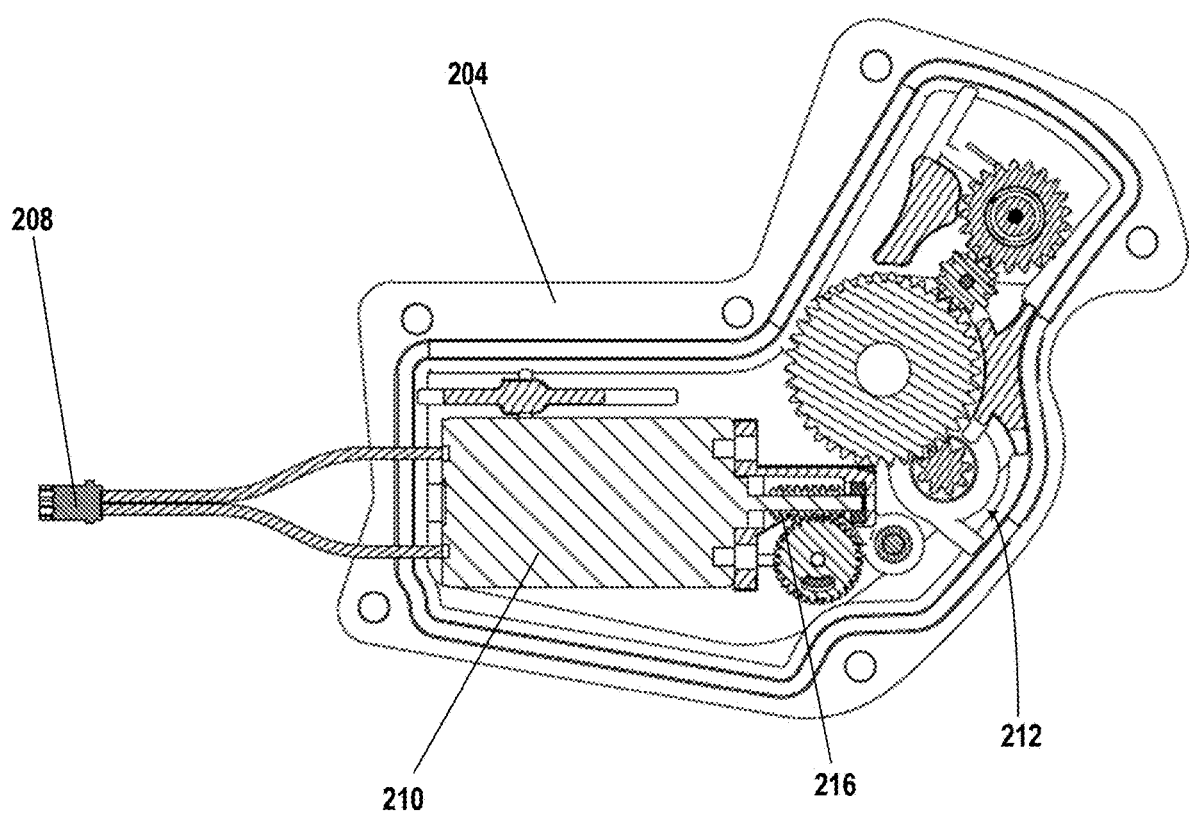
FIG. 7 is a cross-section view through components supported by one example of PCB that is supportable within a movable member.

With reference to FIGS. 6 and 7, the movable member 90 may include, for example, a motor 210, a drive train 212 and an encoder 214 supported by and electrically connected via the PCB 204. The encoder 214 may track shaft rotation of the motor 210, such that a position of the rear derailleur 80 may also be tracked. The battery 96 powers the motor 210 and drives the drive train 212 via an output worm gear 216, as shown in FIG. 7. The powered motor 210 drives the drive train 212 to move the chain C between different sprockets G1-G11.

Figure 8A:
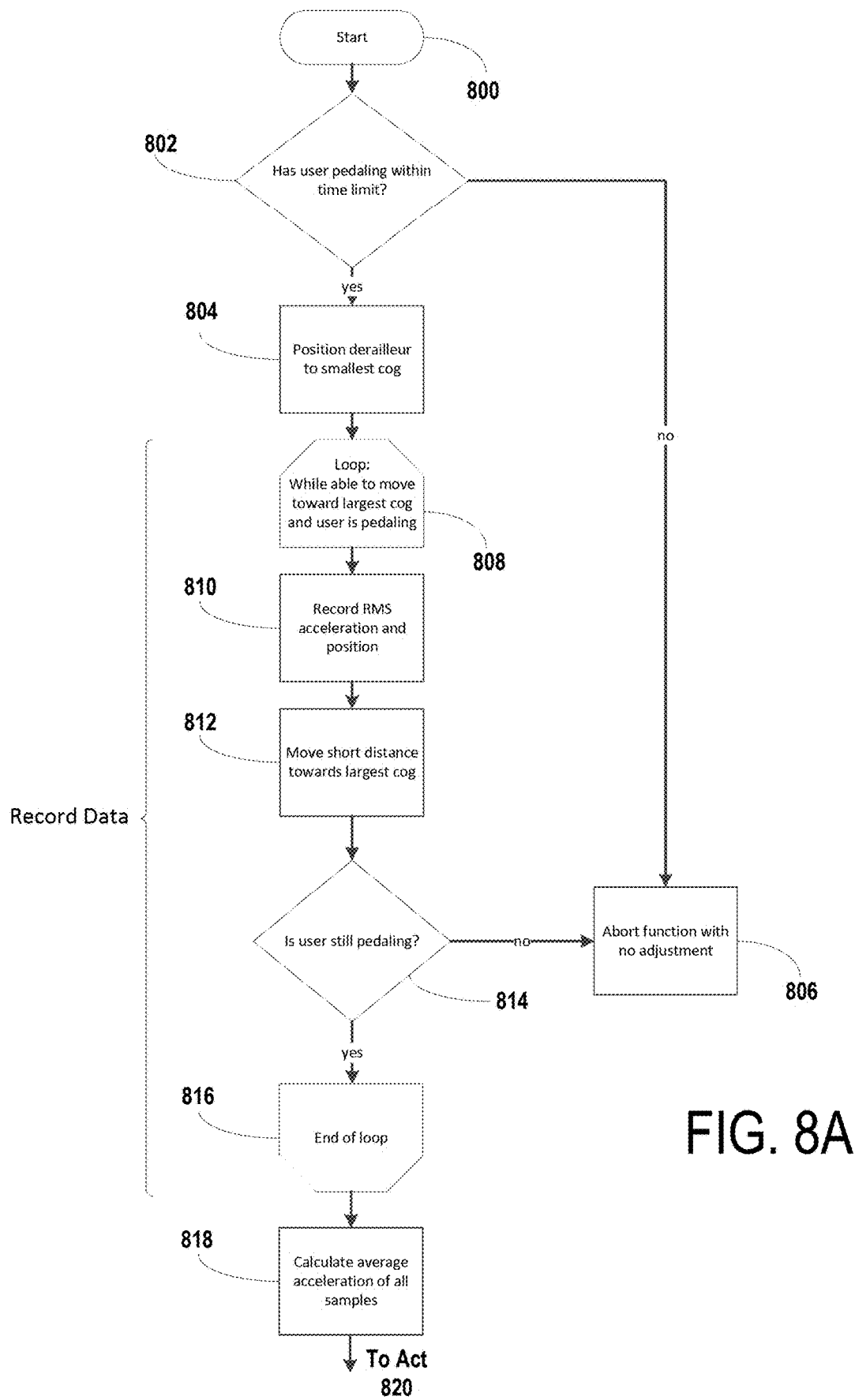
FIGS. 8a and 8b represent a flowchart of an embodiment of an automatic adjustment mode for alignment of a rear derailleur.
Figure 8B:
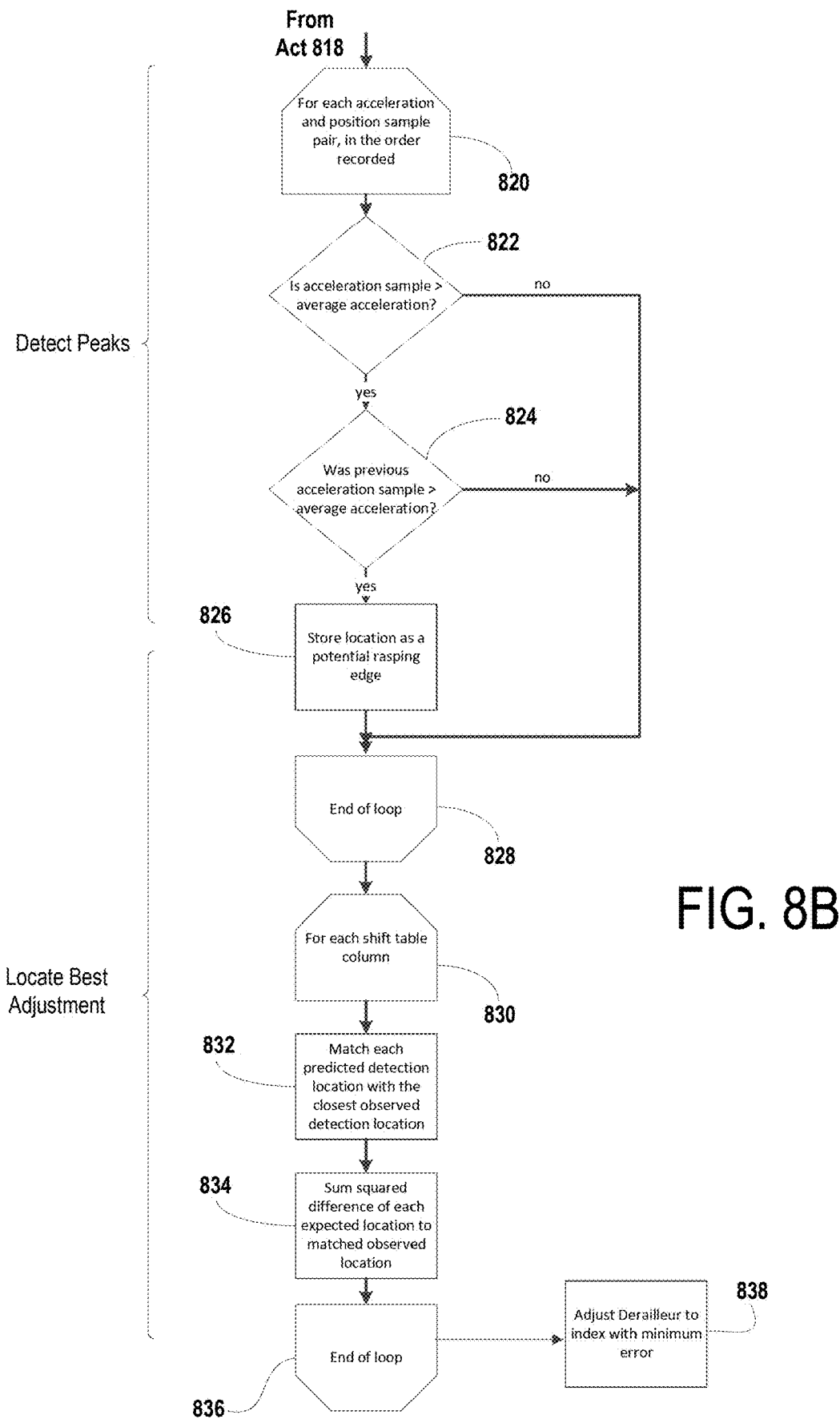

FIG. 8a-8b together show a flowchart of an embodiment of a method for automatic adjustment of a bicycle rear derailleur. As presented in the following sections, the acts may be performed using any combination of the components indicated in previous figures and/or other components. For example, the following acts may be performed by components supported by the PCB 204 (e.g., the processor and the memory), as well as additional and/or other components. Additional, different, or fewer acts may be provided. The acts are performed in the order shown or in other orders. The acts may be repeated.

In act 800, an automatic adjustment mode for a rear derailleur is initiated. The automatic adjustment mode may be initiated in any number of ways including, for example, by a processor of the rear derailleur initiating the automatic adjustment mode in response to data (e.g., a request) received by the processor. For example, a user may interact with an interface (e.g., a button) at the rear derailleur, an interface elsewhere on the bicycle (e.g., at the control unit mounted to the handlebars 68), and/or an interface on a mobile device in communication with the rear derailleur, and the interface may generate and transmit the request to the processor based on the interaction.

For example, the user may press the button at the rear derailleur a number of times (e.g., three rapid presses) to initiate the automatic adjustment mode for the rear derailleur. Alternatively, the user may press a button on another component of the bicycle such as, for example, a shifter to initiate the automatic adjustment mode. The automatic adjustment mode may be initiated in other ways. For example, the processor may automatically initiate the automatic adjustment mode based on an identified motion of the bicycle (e.g., pedaling the bicycle within a predetermined range of speeds for at least a predetermined amount of time) and/or an identified position of the bicycle (e.g., identified as upside down based on data from one or more accelerometers of the rear derailleur).

For a rear derailleur that has an adjustable "b-gap", the "b-gap" is to be correctly set. For derailleurs with high and low travel limits, the high and low limits are to be correctly set. Typically, to set the high and low travel limits and the "b-gap", the real derailleur is to be adjusted approximately correctly before running automatic adjustment function. A rear derailleur that does not require a "b-gap" setting or limit screws does not need adjustment before running the automatic adjustment. For automatic adjustment to work, the bicycle may be secured in a maintenance stand or inverted with the saddle and handlebars resting on the ground, allowing the bicycle to be pedaled forward with the rear wheel freely spinning.

In act 802, the processor determines whether the user is pedaling within a predetermined time limit. In other words, once the automatic adjustment mode is initiated in act 800, the processor expects the user to begin pedaling the bicycle by hand. In one embodiment, the processor samples acceleration values from the one or more accelerometers of the rear derailleur at a predetermined interval or continuously. In one example, the processor further processes the sampled acceleration values by, for example, calculating an overall acceleration based on sampled values from more than one accelerometer and/or averaging the sampled acceleration values.

The processor compares the sampled acceleration values and/or the processed acceleration values to a predetermined acceleration threshold for a predetermined amount of time. The predetermined acceleration threshold may be stored in the memory of the rear derailleur or another memory and may represent a vibration induced in the rear derailleur from the chain moving through jockey wheels of the rear derailleur (e.g., the tensioner wheel 100 and the guide wheel 104 of the rear derailleur 80). The predetermined amount of time is stored in the memory or another memory and may be any number of predetermined amounts of time. For example, the processor may compare the sampled acceleration values and/or the processed acceleration values to the predetermined acceleration threshold for ten seconds. During the predetermined amount of time, when the processor identifies a respective sampled acceleration value and/or a respective processed acceleration value greater than the predetermined acceleration threshold, the method moves to act 804, and the automatic adjustment mode continues. When the processor does not identify a respective sampled acceleration value and/or a respective processed acceleration value greater than the predetermined acceleration threshold during the predetermined amount of time, the method moves to act 806, where the automatic adjustment mode is aborted without any adjustment. If the processor exits the automatic adjustment mode in act 806, the processor may enter a normal function mode in which movement of the rear derailleur may be controlled by the user via one or more user interfaces on the bicycle (e.g., at the control unit mounted to the handlebars 68).

In act 804, the processor controls current from a power source (e.g., the battery 96) of the rear derailleur to a motor of the rear derailleur to position a part of the rear derailleur (e.g., the cage plate 93) to a predetermined initial position. The processor may control the current from the power source to the motor, such that the part of the rear derailleur is positioned at the predetermined initial position quickly. The predetermined initial position may be any number of positions including, for example, an outboard most position or a position in line with a smallest sprocket (e.g., the sprocket G11) of a rear sprocket assembly (e.g., the sprocket assembly 78). In other words, the processor moves the cage plate of the rear derailleur to a position in line with the smallest sprocket of the rear sprocket assembly, such that a chain is positioned around the smallest sprocket of the rear sprocket assembly. Other predetermined initial positions may be provided including, for example, a position in line with a largest sprocket (e.g., the sprocket G1).

In one embodiment, while the motor moves the cage plate to the predetermined initial position, the processor may continue to verify the sampled acceleration value and/or the processed acceleration value is above the predetermined acceleration threshold. The processor may abort the automatic adjustment mode if the pedaling condition is not satisfied. In other words, the processor may abort the automatic adjustment mode when the sampled acceleration value and/or the processed acceleration value is below the predetermined acceleration threshold.

In another embodiment, the bicycle may include a crank-based cadence sensor. The crank-based cadence sensor may monitor a pedaling state of the bicycle and communicate the monitored pedaling state to the processor of the rear derailleur. While moving toward the predetermined initial position, the rear derailleur may detect a stall condition based on the monitored pedaling state received from the crank-based cadence sensor and/or an encoder value indicating a position of the rear derailleur is not advancing towards the predetermined initial position. The processor may abort the automatic detection mode based on the detected stall condition. In one embodiment, the rear derailleur may include an LED or a noise generator (e.g., a speaker or an alarm circuit) operable to indicate the abortion or failure of the automatic detection mode with, for example, a coded flash sequence or an alarm sound.

The processor controls the current from the power source of the rear derailleur to the motor of the rear derailleur to move the part of the rear derailleur (e.g., the cage plate) towards a position on an opposite end of the rear sprocket assembly (e.g., to an inward most position or a position in line with the largest sprocket) while the user continues to pedal the bicycle. In act 808, the processor initiates a loop (e.g., acts 808-816) in which data is recorded at each position of the movement of, for example, the cage plate towards the position at the largest sprocket.

In act 810, the processor determines and stores an acceleration signal power value at the respective position of the rear derailleur (e.g., of the cage plate of the rear derailleur). The determination of the acceleration signal power value includes the processor sampling acceleration values from at least one of the one or more accelerometers when the rear derailleur is at the respective position. In other words, between movements, the rear derailleur samples the acceleration values from the at least one accelerometer. The at least accelerometer is, for example, integral to the rear derailleur. The processor samples the acceleration values for any number of predetermined periods of time including, for example, 100 milliseconds. The predetermined sampling period of time may be stored in the memory. The at least one accelerometer is sampled at any number of rates including, for example, 1,000 hertz, 100 hertz, 500 hertz, 2,000 hertz, or another sampling rate. In one embodiment, the at least one accelerometer may sample in three mutually orthogonal axes. The sampled acceleration values may be stored in the memory or another memory.

After the sampling period, the processor calculates an average value of all of the sampled acceleration values and subtracts the calculated average value from each of the sampled acceleration values. This eliminates any DC offset such as gravity for each accelerometer axis. All processed acceleration values (e.g., sampled acceleration values with DC offset eliminated) are then combined into a single acceleration signal power value by summing the square of each of the processed acceleration values divided by the number of the sampled acceleration values. A position of the rear derailleur (e.g., a position of a cage plate of the rear derailleur or a rear derailleur position encoder value) at which the acceleration values were sampled is stored in the memory of the rear derailleur or another memory with the determined acceleration signal power value (e.g., as a data sample pair or a first dataset).

In act 812, the processor controls the current from the power source of the rear derailleur to the motor of the rear derailleur to move the part of the rear derailleur (e.g., the cage plate) in a small motion towards the opposite end position (e.g., the sprocket G1). The small motion may be a percentage of a total travel range of motion between the initial position (e.g., at the sprocket G11) and the opposite end position (e.g., at the sprocket G1). For example, the small motion may be 0.25% of the total travel range of motion. Other predetermined motions (e.g., other percentages of the total motion) may be provided.

In act 814, the processor determines whether the user is still pedaling. If the pedaling condition is not satisfied, the method moves to act 806, where the automatic adjustment mode is aborted. In other words, the processor may abort the automatic adjustment mode when the sampled acceleration value and/or the processed acceleration value is below the predetermined acceleration threshold. Otherwise, the method moves to act 816, where the loop ends.

The rear derailleur (e.g., the processor of the rear derailleur) repeats the move and acceleration sample sequence (e.g., acts 808-816) until the rear derailleur reaches an opposite limit of travel (e.g., a position in line with the sprocket G1). This results in a table of position and acceleration signal power pairs, which may be stored in the memory of the rear derailleur or another memory. If during the motion sweep the rear derailleur is unable to move towards a target position for a predetermined number of attempts, the processor of the rear derailleur may exit the automatic adjustment mode without making an adjustment. An LED on the rear derailleur, for example, may indicate the abortion (e.g., failure) of the automatic adjustment mode with a coded flash sequence.

Figure 9:
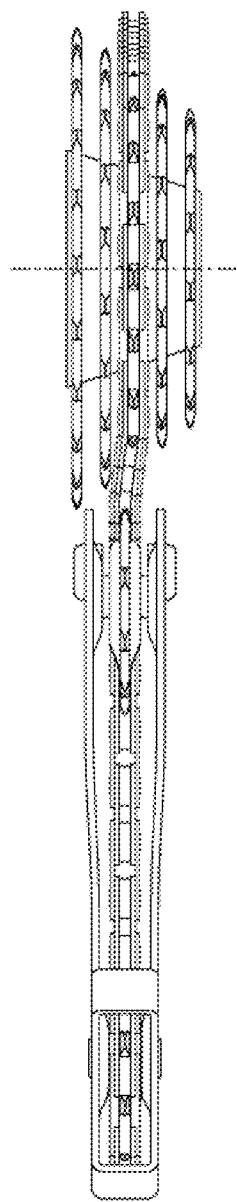
FIG. 9 is a top view of one embodiment a drive train for a bicycle illustrating rasping on a rear sprocket assembly.
Figure 10:
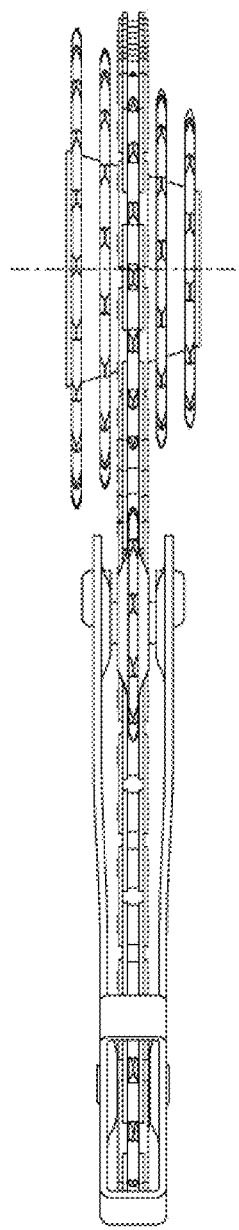
FIG. 10 is a top view of one embodiment of a drive for a bicycle after a shift to a sprocket.

As the rear derailleur moves across the rear sprocket assembly, the rear derailleur shifts through each sprocket from smallest (e.g., the sprocket G11) to largest (e.g., the sprocket G1). While advancing from one sprocket to the next, there is a range of positions shortly before the chain derails to the next sprocket where the chain rasps on the adjacent larger sprocket. FIG. 9 illustrates an example of the chain rasping on an adjacent larger sprocket, and FIG. 10 illustrates an example of the chain C on a sprocket after shifting. This rasping is detectable with, for example, the accelerometer integral to the rear derailleur. After the rear derailleur reaches the final position (e.g., the opposite end position) in the move of the rear derailleur across the rear sprocket assembly, the processor of the rear derailleur processes position and acceleration data from the table of position and acceleration signal power pairs generated and stored in acts 808-816.

Figure 11:
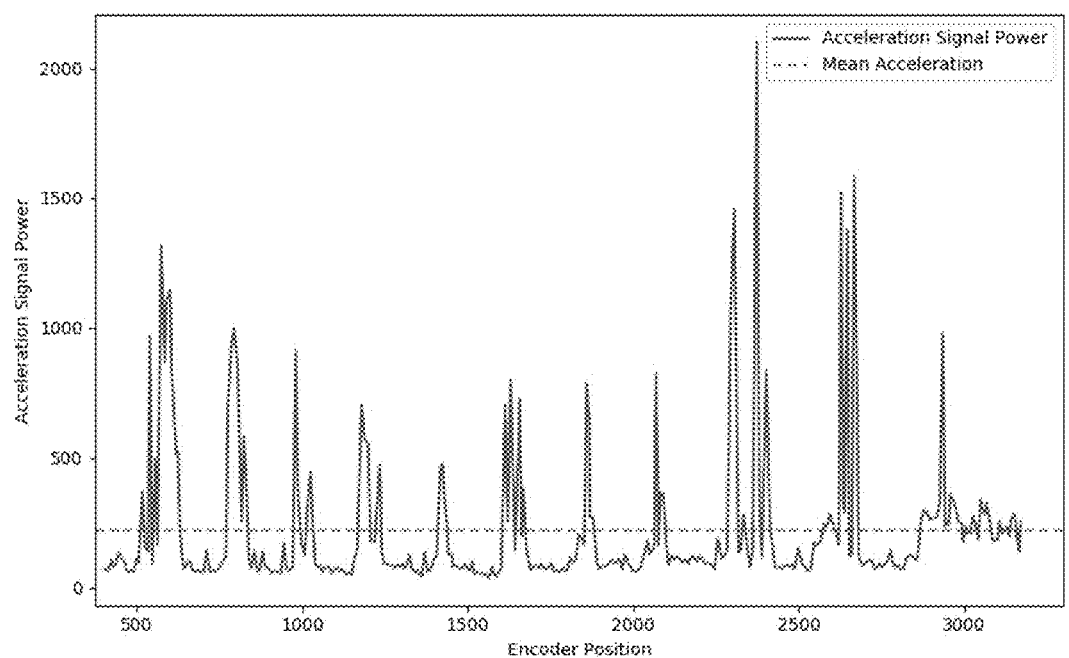
FIG. 11 shows an exemplary graph of acceleration signal power and mean acceleration versus rear derailleur encoder position.
Figure 12:
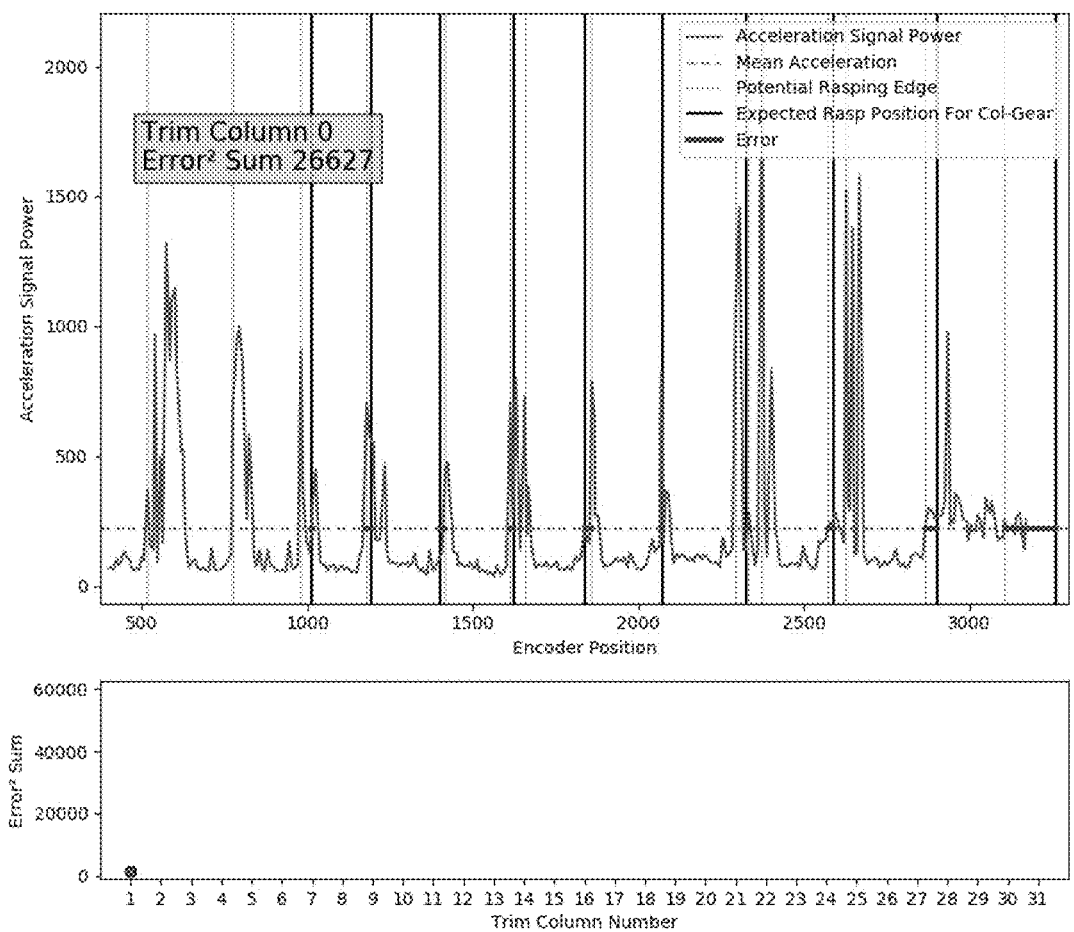
FIGS. 12-16 each show an exemplary graph of acceleration signal power versus rear derailleur encoder position, and an exemplary graph of error versus table column number.
Figure 13:
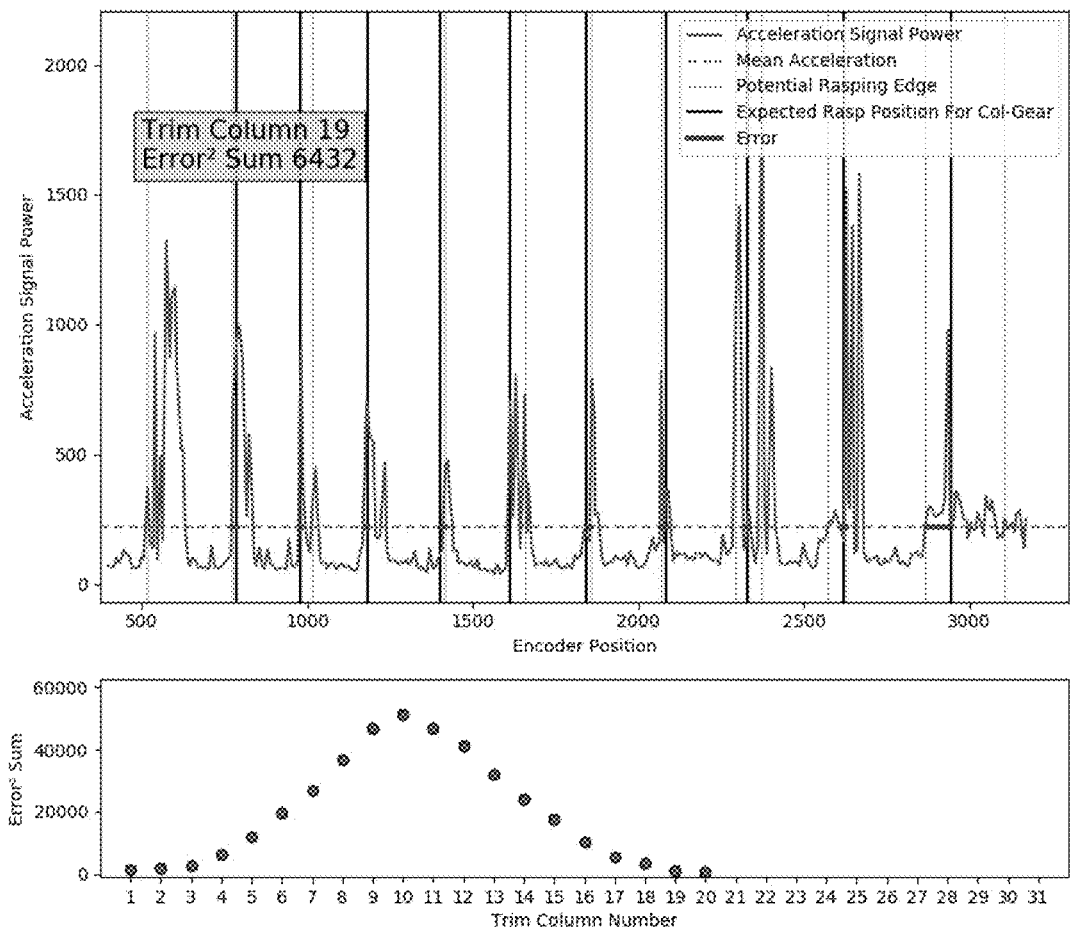
Figure 14:
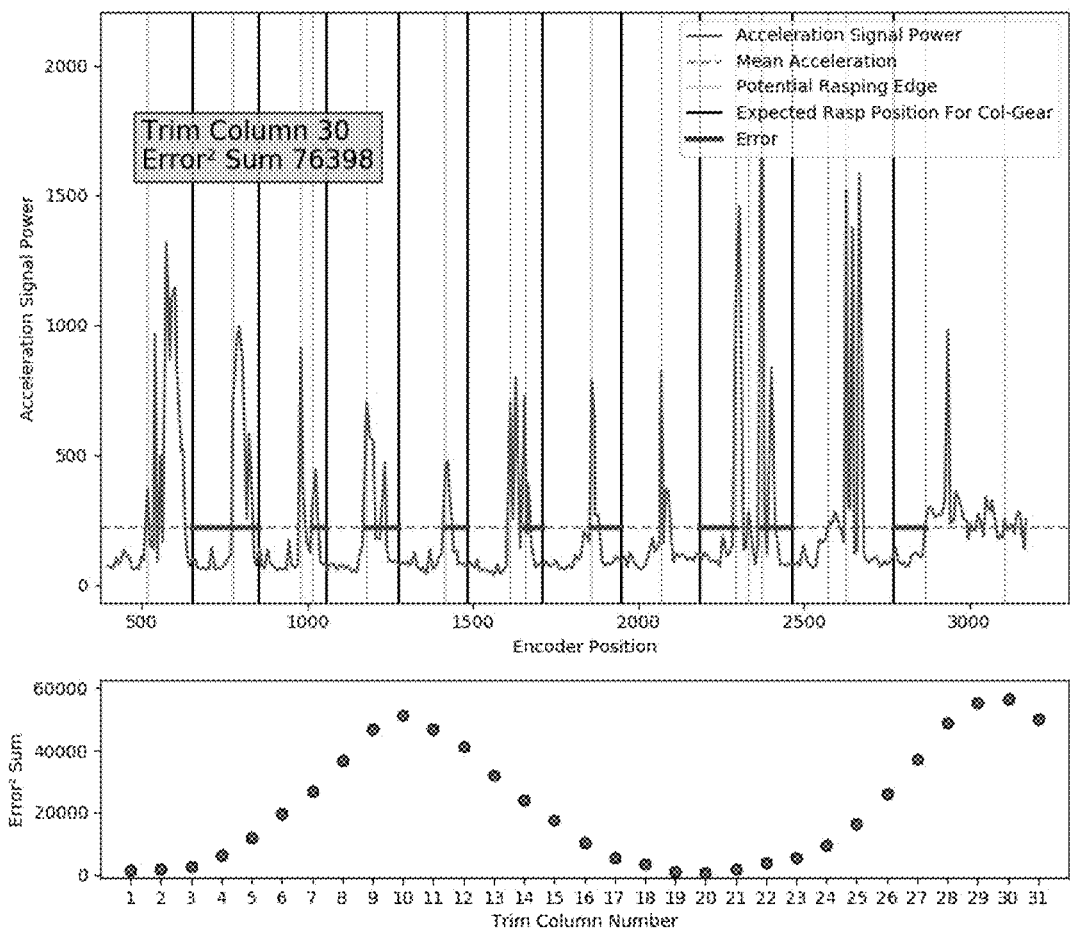
Figure 15:
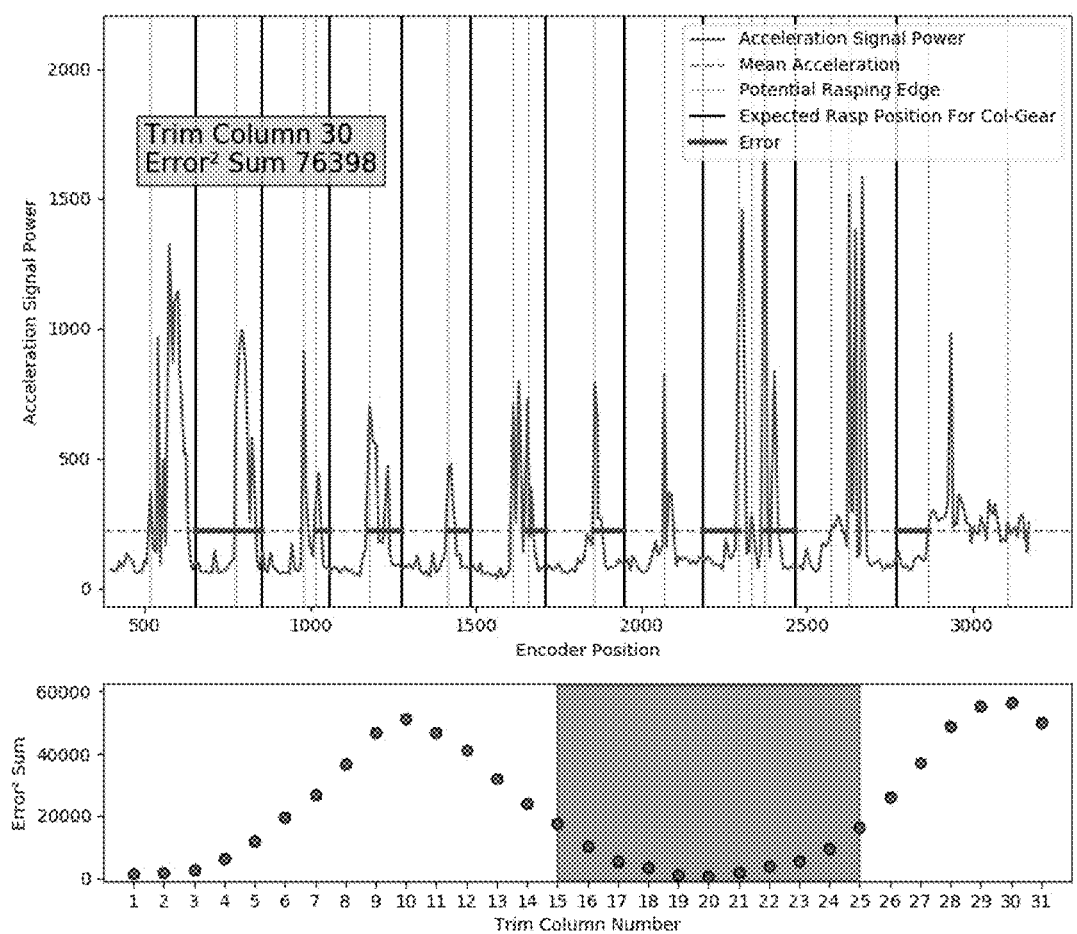
Figure 16:
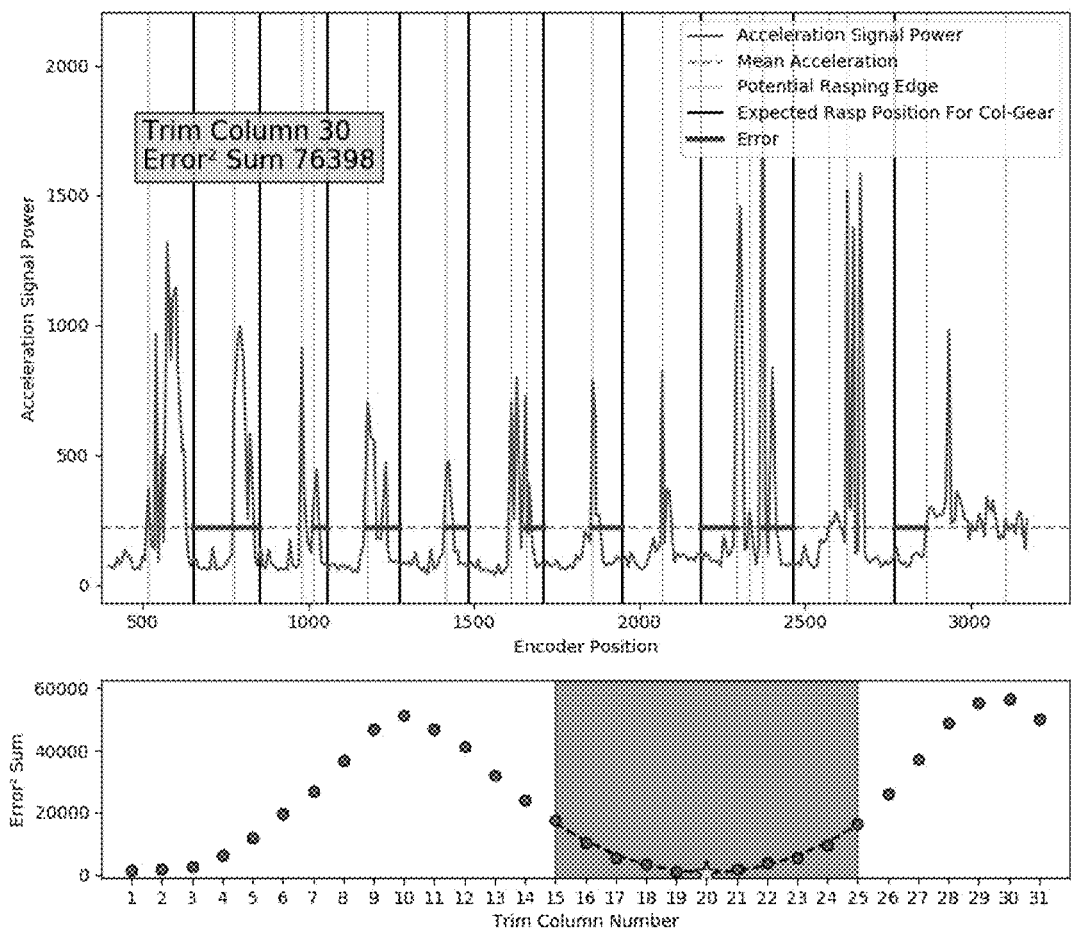

In act 818, the processor determines a threshold acceleration signal power. In one embodiment, the threshold acceleration signal is determined based on an average acceleration signal power of all acceleration signal power samples or based on a scaled value of the average acceleration signal power. In another embodiment, the threshold acceleration signal power is a preprogrammed value stored in the memory of the rear derailleur or another memory and identified by the processor of the rear derailleur. FIG. 11 shows an exemplary graph of acceleration signal power and mean acceleration versus rear derailleur encoder position.

In act 820, the processor initiates a loop (e.g., acts 822-828) in which peaks are detected within the data sample pairs stored in the memory. Acts 822-828 are executed for each data sample pair in an order in which the data sample pairs were stored. For example, starting at a first data sample pair stored in the memory and iterating sequentially though each data sample pair in the order recorded the derailleur identifies potential locations of a start of each rasping area.

For acts 822 and 824, the processor compares the acceleration signal power of the respective data sample pair to the threshold acceleration signal power determined in act 818.

In act 822, the processor determines whether the respective acceleration signal power exceeds the threshold acceleration signal power. In act 824, the processor determines whether the previous acceleration signal power is less than the threshold acceleration signal power or whether a configurable number of previous acceleration signal powers are less than the threshold acceleration signal power. When the processor determines the conditionals of both act 822 and act 824, respectively, to be true, the corresponding position (e.g., the derailleur encoder position) of the respective data sample pair may be considered a potential location of the start of a rasping area, and the method moves to act 826; in act 826, the potential location of the start of the rasping area is stored in the memory of the rear derailleur or another memory. The method then moves to act 828, where the respective loop ends. When the processor determines the conditional of act 822 or the conditional of act 824 to not be true, the method moves to act 828, and a respective loop ends.

Each potential edge of rasping position is stored in the memory of the rear derailleur or another memory. Once each data sample pair is processed, the processor of the rear derailleur correlates the potential rasping locations to expected rasping positions of each gear for each possible adjustment value. For each gear location, for each adjustment value, the processor of the rear derailleur calculates or retrieves a corresponding location for where rasping is expected to start as the rear derailleur moves inboard, for example. The expected rasping location may be taken from a table with one entry for each adjustment/gear combination (see, e.g., Table 2) or a table with an entry for each gear that may be applied at any adjustment value (see Table 3).

The tables discussed above may be predetermined and stored in the memory of the derailleur or another memory. Exemplary tables are provided below: Table 1 is a two dimensional table of gear position targets, where one dimension is the target gear index, and the other dimension is an adjustment index; Table 2 is a two-dimensional table of expected rasping positions for each target gear index for each adjustment index (e.g., a plurality of second datasets with each second dataset of the plurality of second datasets forming a column of the table associated with a respective adjustment index); and Table 3 is a one-dimensional table of an approximate offset for each gear from any adjustment index.

TABLE 1

| | Adjustment Index | | | | | | | | | |
|---|---|---|---|---|---|---|---|---|---|---|
| Gear Index | 1 | 2 | 3 | 4 | 5 | 6 | 7 | 8 | 9 | 10 |
| 1 | 160 | 170 | 180 | 190 | 200 | 210 | 220 | 230 | 240 | 250 |
| 2 | 560 | 570 | 580 | 590 | 600 | 610 | 620 | 630 | 640 | 650 |
| 3 | 960 | 970 | 980 | 990 | 1000 | 1010 | 1020 | 1030 | 1040 | 1050 |
| 4 | 1360 | 1370 | 1380 | 1390 | 1400 | 1410 | 1420 | 1430 | 1440 | 1450 |
| 5 | 1760 | 1770 | 1780 | 1790 | 1800 | 1810 | 1820 | 1830 | 1840 | 1850 |
| 6 | 2160 | 2170 | 2180 | 2190 | 2200 | 2210 | 2220 | 2230 | 2240 | 2250 |
| 7 | 2560 | 2570 | 2580 | 2590 | 2600 | 2610 | 2620 | 2630 | 2640 | 2650 |
| 8 | 2960 | 2970 | 2980 | 2990 | 3000 | 3010 | 3020 | 3030 | 3040 | 3050 |
| 9 | 3360 | 3370 | 3380 | 3390 | 3400 | 3410 | 3420 | 3430 | 3840 | 3850 |
| 10 | 3760 | 3770 | 3780 | 3790 | 3800 | 3810 | 3820 | 3830 | 3840 | 3850 |

TABLE 2

| | Adjustment Index | | | | | | | | | |
|---|---|---|---|---|---|---|---|---|---|---|
| Gear Index | 1 | 2 | 3 | 4 | 5 | 6 | 7 | 8 | 9 | 10 |
| 1 | 360 | 370 | 380 | 390 | 400 | 410 | 420 | 430 | 440 | 450 |
| 2 | 760 | 770 | 780 | 790 | 800 | 810 | 820 | 830 | 840 | 850 |
| 3 | 1160 | 1170 | 1180 | 1190 | 1200 | 1210 | 1220 | 1230 | 1240 | 1250 |
| 4 | 1560 | 1570 | 1580 | 1590 | 1600 | 1610 | 1620 | 1630 | 1640 | 1650 |
| 5 | 1960 | 1970 | 1980 | 1990 | 2000 | 2010 | 2020 | 2030 | 2040 | 2050 |
| 6 | 2360 | 2370 | 2380 | 2390 | 2400 | 2410 | 2420 | 2430 | 2440 | 2450 |
| 7 | 2760 | 2770 | 2780 | 2790 | 2800 | 2810 | 2820 | 2830 | 2840 | 2850 |
| 8 | 3160 | 3170 | 3180 | 3190 | 3200 | 3210 | 3220 | 3230 | 3240 | 3250 |
| 9 | 3560 | 3570 | 3580 | 3590 | 3600 | 3610 | 3620 | 3630 | 3640 | 3650 |

TABLE 3

|  |  | Rasp Offset From Target |
|---|---|---|
| Gear Index | 1 | 200 |
| | 2 | 215 |
| | 3 | 205 |
| | 4 | 185 |
| | 5 | 190 |
| | 6 | 205 |
| | 7 | 209 |
| | 8 | 180 |
| | 9 | 195 |
| | 10 | 200 |

A rear derailleur that is capable of being combined with multiple rear sprocket assemblies (e.g., cassettes) with different tooth counts per sprocket, a different number of sprockets, or different manufacturing processes may have different expected rasping locations for each unique cassette. The processor of the rear derailleur may identify the cassette with which the rear derailleur is configured through, for example, a mobile device (e.g., a smartphone application) or another interface. The adjustment value with the best correlation of expected rasping locations to observed rasping locations may be selected as an ideal adjustment value.

To correlate the observed potential rasping locations to the expected locations, the processor of the rear derailleur calculates an error value for each adjustment. In act 830, the processor identifies data stored within the memory or another memory for determining expected rasping positions. For example, the processor identifies a two-dimensional table stored in the memory (see Table 2) for determining expected rasping positions. The identified two-dimensional table may correspond to the particular rear sprocket assembly installed on the bicycle. The identified two-dimensional table may be a two-dimensional table of expected rasping positions for each target gear index for each adjustment index. In act 830, the processor of the rear derailleur starts a loop in which a correlation error is determined for each adjustment index. In one embodiment, each loop is for a column of the identified two-dimensional table.

In act 832, for a given adjustment value (e.g., adjustment index), the processor matches each of the expected rasping locations to the closest observed potential rasping location stored in the memory. In act 834, the processor squares a difference between the expected rasping location and the observed rasping location for each gear index. The processor sums the squared differences for each rasping location to a value representing a correlation error for the adjustment value. In act 836, the processor ends the loop, and the method returns to act 830 if additional columns of the identified table remain to be processed. FIGS. 12-16 each show an exemplary graph of acceleration signal power versus rear derailleur encoder position, and an exemplary graph of error versus table column number (e.g., corresponding to adjustment value).

The better target positions (e.g., expected rasping positions) included within the adjustment index match the observed potential rasping locations, the lower the error value will be. In act 838, the adjustment value (e.g., adjustment index) with the lowest error is considered to have the best correlation with the observed potential rasping locations and is selected as the adjustment for the derailleur. The adjustment index specifies a set of position targets to be used for derailleur positioning during normal operation of the bicycle (see Table 1) (e.g., a plurality of third datasets with each third dataset of the plurality of third datasets forming a column of the table associated with a respective adjustment index). The selected adjustment value and/or corresponding target positions are stored in the memory and used by the processor to operate the rear derailleur. In one embodiment, the method of FIG. 8 is used to automatically adjust a front derailleur.

Some rear derailleurs have a very wide adjustment range, such that the rear derailleur may be adjusted far enough in one direction that the rear derailleur correctly shifts between sprockets but cannot reach every sprocket because the rear derailleur is misadjusted by a distance of one or more whole sprockets. In such rear derailleurs, an incorrect adjustment error value representing one or more gears off may result in the lowest error.

To prevent selecting the wrong adjustment, a final position the rear derailleur achieved during the sampling motion sequence may be used to limit the available adjustment values to select from (e.g., within the identified table; Table 2). The final position of the rear derailleur may be adjustable and/or may be based on a physical limitation. For example, an adjustable screw may be used to adjust the final position (e.g., a low limit). As another example, cage to cog contact at, for example, the largest sprocket of the rear sprocket assembly may define the final position the rear derailleur may achieve during the sampling motion.

If an inboard limit screw is correctly adjusted, then the final position the rear derailleur achieves may be relatively close to an actual positioning target for the inboard most gear. The adjustment index with the inboard sprocket target position closest to the final position of the rear derailleur may be a reasonable approximation of the correct adjustment index. Only adjustment indexes within a specified range of the matched target index may be considered when identifying an adjustment index with a lowest error.

In one embodiment, instead of selecting a minimum error, the accelerometer signal power samples or a subset of the accelerometer signal power samples may be used by the processor to generate a polynomial regression function. A minimum of the polynomial function may identify the best adjustment index.

In one embodiment, an accelerometer signal power versus position dataset (e.g., data sample pairs) may also be generated over time while the user or another user rides the bicycle by sampling the at least one accelerometer during shifts. Once enough data has been collected, the processor may run a correlation algorithm (e.g., at least acts 830-836). If the correlation algorithm detects a better adjustment for the rear derailleur, the processor may either automatically make the adjustment or notify the user that the rear derailleur needs adjustment.

The minimum correlation value may be an indicator of other system issues. For example, if the minimum correlation value is greater than a predetermined threshold, a bicycle rear derailleur hangar may be bent. Other actionable indicators of system damage or misadjustment may include, for example, a difference between a minimum error and a maximum error or a nonlinear correlation per gear. A warning that a system error occurred and/or maintenance is required for proper performance may then be transmitted. The warning may be any number of different types of warning including, for example, an audible warning, a visual warning displayed to the rider via (e.g., on an output device of a computer or control device on the handlebar of the bicycle), and/or a text message at a mobile device not located on the bicycle.

In one embodiment, the at least one accelerometer is not integral to the rear derailleur but is mounted to a frame of the bicycle. In another example, a microphone may replace the accelerometer on the bicycle or may be provided in addition to the accelerometer to identify potential chain rasping positions. In yet another embodiment, instead of measuring vibration (e.g., with the accelerometer) or noise (e.g., with the microphone), absence of vibration or noise is used to identify calibration positions. Low feedback areas may be averaged as mean positions between two chain rasping positions, which may be indicative of a cog width or a position between cog gears. In one embodiment, as the rear derailleur moves during calibration, a leading edge or vibration or noise is recorded as a relevant position. In another embodiment, a trailing edge (e.g., where the vibration or the noise ceases) is recorded and compared with stored values.

In one embodiment, the motion sweep moves from the inboard most gear to the outboard most gear relative to the frame of the bicycle instead of from the outboard most gear to the inboard most gear. In one embodiment, the method is applied to a subset of gears or sprockets instead of all sprockets of the rear sprocket assembly. In another embodiment, one or more gears (e.g., a total number of gears or a subset of gears) may have a greater calibration priority than an average of gears. For example, larger gears with more shift locations may be more or less sensitive to miss shifts, such that calibration routing may prioritize calibrating the larger gears to a greater level of precision than the average of all of the gears. In one embodiment, the rider may prioritize the gears that are most important to the rider to provide, for example, optimized shifting during slow speed climbing or high speed riding. Such prioritization may be provided by, for example, weighting the differences calculated in act 834.

In one embodiment, the method may be executed without the rear derailleur running into a limit screw (e.g., if the rear derailleur is unlikely to be misadjusted by a whole gear or sprocket). In one embodiment, the method may be applied to a front derailleur instead of or in addition to a rear derailleur.

Each of the above-described examples illustrates that the configuration and construction of the bicycle rear derailleur can be varied in different ways. However, other examples different from those disclosed and described herein are also possible. The invention and the disclosure are not intended to be limited to only the examples discussed above.

Although certain bicycle derailleurs, bicycles, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An electromechanical derailleur for a bicycle, the electromechanical derailleur comprising:
a base member mountable to a frame of the bicycle;
a movable member movably coupled to the base member;
a chain guide assembly rotatably connected to the movable member; and
a processor configured to:
identify and store potential chain rasping positions based on sensor data;
identify a plurality of datasets, each dataset of the plurality of datasets representing expected chain rasping positions for each gear of a plurality of gears;
selecting an identified adjustment index from a plurality of adjustment indexes for the electromechanical derailleur based on an error value, the error value of each adjustment index of the plurality of adjustment indexes being determined by a comparison of the identified potential chain rasping positions and the plurality of datasets; and
operate the electromechanical derailleur based on the identified adjustment index,
wherein the plurality of adjustment indexes are prestored.

2. The electromechanical derailleur of claim 1, wherein the identification of the potential chain rasping positions based on sensor data comprises identification of a plurality of first datasets, each first dataset of the plurality of first datasets including data representing an acceleration of a portion of the electromechanical derailleur at a respective position of the chain guide assembly relative to the base member,
wherein the plurality of datasets are a plurality of second datasets, and
wherein a final position of the rear derailleur and the acceleration of a portion of the electromechanical derailleur at respective positions are learned during a sampling motion sequence, and wherein the final position of the rear derailleur learned during the sampling motion sequence limits the available adjustment indexes to select from.

3. The electromechanical derailleur of claim 2, wherein the identification of the adjustment for the electromechanical derailleur includes:
comparison of the potential chain rasping positions with the plurality of second datasets; and
identification of a second dataset of the plurality of second datasets based on the comparison,
wherein operation of the electromechanical derailleur based on the selected adjustment index includes operation of the electromechanical derailleur based on the identification of the second dataset.

4. The electromechanical derailleur of claim 3, further comprising a memory configured to store the plurality of first datasets, the identified potential chain rasping positions, the plurality of second datasets, or any combination thereof.

5. The electromechanical derailleur of claim 4, wherein the memory is configured to store the plurality of first datasets in a sequential order,
wherein the identification of potential chain rasping positions includes:
in the sequential order, for each first dataset of at least some first datasets of the plurality of first datasets:
determination of whether the respective acceleration is greater than a predetermined threshold acceleration;
determination of whether the respective acceleration is greater than each of a predetermined number of sequentially previous accelerations of the plurality of first datasets; and
identification, based on the determinations, of the respective position as one of the potential chain rasping positions when the respective acceleration is greater than the predetermined threshold acceleration and the respective acceleration is greater than each of the predetermined number of sequentially previous accelerations.

6. The electromechanical derailleur of claim 3, wherein the identification of the plurality of second datasets includes identification of a table, each second dataset of the plurality of second datasets forming a column or a row of the table and being associated with a respective adjustment index, and
wherein operation of the electromechanical derailleur based on the identification of the second dataset includes operation of the electromechanical derailleur based on the adjustment index associated with the identified second dataset.

7. The electromechanical derailleur of claim 6, wherein the processor is further configured to identify one or more third datasets, each third dataset of the one or more third datasets representing a position target for each gear of the plurality of gears and being associated with a respective adjustment index, and
wherein operation of the electromechanical derailleur based on the adjustment index associated with the identified second dataset includes:
identification of a third dataset of the plurality of third datasets based on the adjustment index associated with the identified second dataset; and
operation of the electromechanical derailleur based on the identified third dataset.

8. The electromechanical derailleur of claim 2, further comprising at least one accelerometer disposed within the movable member, the chain guide assembly, or the movable member and the chain guide assembly, the at least one accelerometer being configured to generate the data representing the acceleration, and
wherein the portion of the electromechanical derailleur includes the movable member.

9. The electromechanical derailleur of claim 2, further comprising a motor configured to move the movable member relative to the base member,
wherein the identification of the plurality of first datasets includes:
movement, with the motor, of the movable member relative to the base member, such that the chain guide assembly is positioned in a first of the positions of the chain guide assembly relative to the base member;
identification, with one or more sensors, of one or more acceleration values for the portion of the electromechanical derailleur when the chain guide assembly is in the first position;
for each of the positions of the chain guide assembly relative to the base member:
movement, with the motor, of the movable member relative to the base member, such that the chain guide assembly is positioned in a respective one of the positions relative to the base member; and
identification, with the one or more sensors, of one or more acceleration values for the portion of the electromechanical derailleur when the chain guide assembly is in the respective one position; and generation of the plurality of first datasets based on the acceleration values identified for the positions of the chain guide assembly relative to the base member, respectively.

10. The electromechanical derailleur of claim 9, wherein the positions of the chain guide assembly relative to the base member define a range of motion between a smallest gear of the plurality of gears and a largest gear of the plurality of gears, and
wherein the chain guide assembly is aligned with the smallest gear when the chain guide assembly is in the first position.

11. The electromechanical derailleur of claim 9, wherein the one or more sensors include one or more accelerometers integral with the electromechanical derailleur.

12. The electromechanical derailleur of claim 11, wherein the processor is further configured to:
initiate an automatic adjustment mode, the automatic adjustment mode including the identification of the plurality of first datasets, the identification of potential chain rasping positions, the identification of the plurality of second datasets, and the identification of the adjustment for the electromechanical derailleur;
after the initiation of the automatic adjustment mode and before the identification of the plurality of first datasets, determine whether a pedaling condition is met;
abort the automatic adjustment mode when the processor determines the pedaling condition is not met.

13. The electromechanical derailleur of claim 12, wherein the processor is further configured to receive user input data, and
wherein the initiation of the automatic adjustment mode includes initiation of the automatic adjustment mode in response to the received user input data.

14. The electromechanical derailleur of claim 12, further comprising an output device,
wherein the processor is further configured to generate, with the output device, an audio output, a visual output, or an audio and visual output when the automatic adjustment mode is aborted.

15. The electromechanical derailleur of claim 14, wherein the output device includes a noise generator, a light emitting diode (LED), or the noise generator and the LED.

16. A method for automatically adjusting an electromechanical derailleur for a bicycle, the method comprising:
identifying and storing, by a processor, a plurality of first datasets, each first dataset of the plurality of first datasets including data representing an acceleration of a portion of the bicycle and data representing a corresponding position of a chain guide assembly relative to the base member;
identifying, by the processor, potential chain rasping positions based on the plurality of first datasets;
identifying, by the processor, a plurality of second datasets, each second dataset of the plurality of second datasets representing expected chain rasping positions for each gear of a plurality of gears;
selecting, by the processor, an identified adjustment index from a plurality of adjustment indexes for the electromechanical derailleur based on an error value, the error value of each adjustment index of the plurality of adjustment indexes being determined by a comparison of the identified potential chain rasping positions and the plurality of second datasets; and
operating, by the processor, the electromechanical derailleur based on the identified adjustment index,
wherein the plurality of adjustment indexes are prestored.

17. The method of claim 16, further comprising storing, by a memory, the plurality of first datasets,
wherein identifying the plurality of first datasets includes identifying the plurality of first datasets from the memory.

18. The method of claim 16, wherein identifying the adjustment for the electromechanical derailleur includes:
comparing the potential chain rasping positions with the plurality of second datasets; and
identifying a second dataset of the plurality of second datasets based on the comparing,
wherein operating the electromechanical derailleur based on the identified adjustment index includes instructing, by the processor, a motor of the electromechanical derailleur to move the chain guide assembly based on the identification of the second dataset.

19. The method of claim 18, wherein operating the electromechanical derailleur further includes:
receiving, by the processor, a request to shift gears generated in response to a user input; and
instructing, by the processor, the motor to move based on the received request and a respective adjustment index associated with the identified second dataset.

20. A rear derailleur for a bicycle, the rear derailleur comprising:
a base member mountable to a frame of the bicycle;
a movable member movably coupled to the base member;
a chain guide assembly rotatably connected to the movable member; and
a processor configured to:
initiate an automatic adjustment mode, the automatic adjustment mode comprising:
generation of a plurality of first datasets, each first dataset of the plurality of first datasets including data representing an acceleration of a portion of the rear derailleur and data representing a corresponding position of the chain guide assembly relative to the base member;
identification and storing of potential chain rasping positions based on the plurality of first datasets;
identification of a plurality of second datasets, each second dataset of the plurality of second datasets representing expected chain rasping positions for each gear of a plurality of gears;
comparison of the identified potential chain rasping positions with the plurality of second datasets, determining an error value;
selection of a second dataset of the plurality of second datasets based on the determined error value; and
identification of an adjustment index from a plurality of adjustment indexes for shifting based on the selected second dataset corresponding to the adjustment index; and
operation of the rear derailleur based on the adjustment index,
wherein the plurality of adjustment indexes are prestored.

21. The electromechanical derailleur of claim 1, wherein each prestored adjustment index of the plurality of adjustment indexes includes corresponds to a different rear sprocket assembly.

* * * * *